(12) United States Patent
Akashi et al.

(10) Patent No.: US 8,300,300 B2
(45) Date of Patent: Oct. 30, 2012

(54) PARTICLE FOR DISPLAY, PARTICLE DISPERSION LIQUID FOR DISPLAY, DISPLAY MEDIUM, AND DISPLAY DEVICE

(75) Inventors: Ryojiro Akashi, Kanagawa (JP); Akira Imai, Kanagawa (JP); Hiroaki Moriyama, Kanagawa (JP); Satoshi Tatsuura, Kanagawa (JP); Yoshinori Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 867 days.

(21) Appl. No.: 12/398,815

(22) Filed: Mar. 5, 2009

(65) Prior Publication Data

US 2010/0073280 A1    Mar. 25, 2010

(30) Foreign Application Priority Data

Sep. 25, 2008   (JP) ................... 2008-246730

(51) Int. Cl.
*G02B 26/00* (2006.01)
*G02B 26/08* (2006.01)
*G02F 1/29* (2006.01)

(52) U.S. Cl. ........................... 359/296; 359/298

(58) Field of Classification Search .......... 359/290–292, 359/295, 296, 298
See application file for complete search history.

(56) References Cited

U.S. PATENT DOCUMENTS

| 4,806,443 | A | 2/1989 | Yanus et al. |
| 2002/0146572 | A1 | 10/2002 | Yanagisawa |
| 2003/0206330 | A1 | 11/2003 | Nomoto et al. |

FOREIGN PATENT DOCUMENTS

| JP | 2001-117122 | * | 4/2001 |
| JP | A-2002-212423 | | 7/2002 |
| JP | A-2003-15168 | | 1/2003 |
| JP | A-2003-131420 | | 5/2003 |
| JP | A-2004-526210 | | 8/2004 |
| JP | A-2004-279732 | | 10/2004 |
| JP | A-2005-265938 | | 9/2005 |
| JP | B2-3936588 | | 6/2007 |
| WO | WO 02/093246 A1 | | 11/2002 |

* cited by examiner

*Primary Examiner* — Thomas K Pham
*Assistant Examiner* — Brandi Thomas
(74) *Attorney, Agent, or Firm* — Oliff & Berridge, PLC

(57) ABSTRACT

A particle for a display includes a colored particle containing a colorant and a polymer having a chargeable group; and a polymer gel layer that covers a surface of the colored particle and contains a polymer gel.

14 Claims, 4 Drawing Sheets

PARTICLE FOR DISPLAY, PARTICLE DISPERSION LIQUID FOR DISPLAY, DISPLAY MEDIUM, AND DISPLAY DEVICE

CROSS-REFERENCE TO RELATED APPLICATION

This application is based on and claims priority under 35 USC 119 from Japanese patent Application No. 2008-246730 filed on Sep. 25, 2008.

BACKGROUND

1. Technical Field

The present invention relates to particles for a display, a particle dispersion liquid for a display, a display medium, and a display device.

2. Related Art

As a display having memory storage properties, an electrophoresis display medium has been actively studied. In such a display method, display is performed using an electrophoresis material in which electrically charged colored particles (moving particles) are dispersed in a liquid by applying an electric field to alternately move the moving particles to a viewing side and to a rear side within a cell (having a structure in which the electrophoresis material is disposed between two electrode substrates).

In this technique, the electrophoresis material is an important element, and various techniques have been developed. As a liquid in which particles are dispersed, a material having low volatility and high safety as a chemical substance has been desired. Preferable examples of such a liquid having high safety include a paraffin hydrocarbon solvent which is a petroleum-derived high-boiling component (such as a commercially available product, ISOPAR manufactured by Exon Co., Ltd.), silicone oil, and a fluorine-based liquid. A material which stably disperses in this liquid and which is excellent in charging characteristic or electrophoretic properties has been required. In particular, silicone oil is useful due to low volatility, low flammability, and high safety thereof.

However, materials which are stably dispersed in silicone oil and have stable charging characteristics have hardly been known.

SUMMARY

According to an aspect of the invention, there is provided a particle for a display including:

a colored particle containing a colorant and a polymer having a chargeable group; and a polymer gel layer that covers the surface of the colored particle and contains a polymer gel.

BRIEF DESCRIPTION OF THE DRAWINGS

Exemplary embodiments of the present invention will be described in detail based on the following figures, wherein.

DETAILED DESCRIPTION

Figure 1:
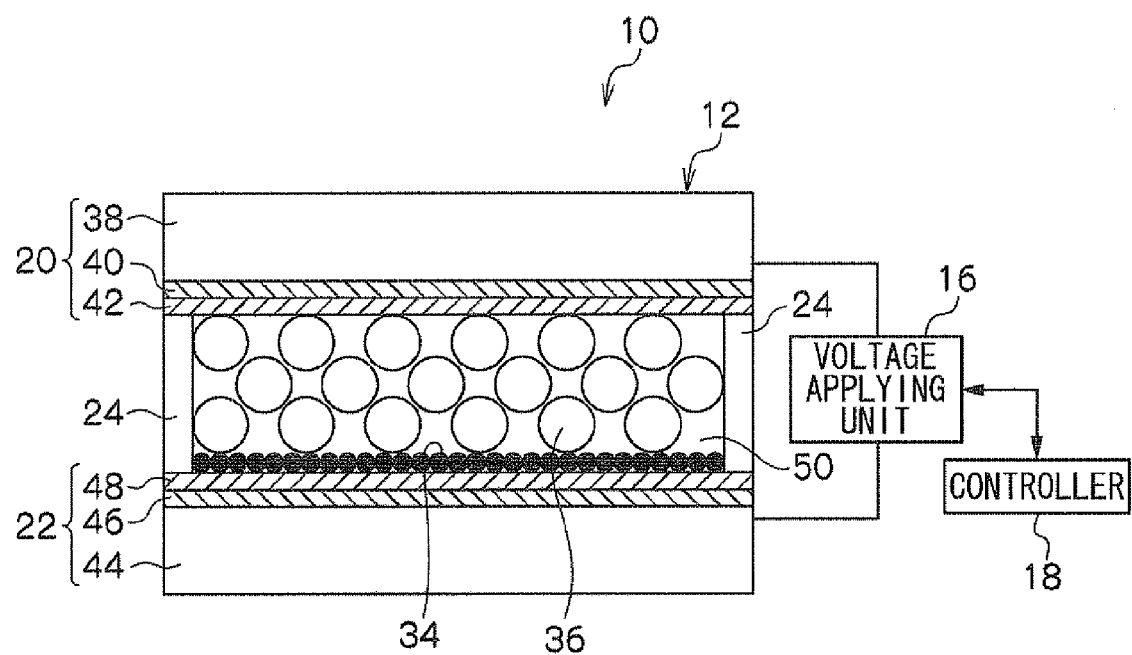
FIG. 1 is a schematic configuration diagram of a display device according to a first exemplary embodiment.

Hereinafter, exemplary embodiments of the present invention will be described.

(Particle for a Display and Particle Dispersion Liquid for a Display)

A particle dispersion liquid for a display according to the present exemplary embodiment contains a group of particles (a group of moving particles) containing a particle for a display (a moving particle) that moves according to an electric field and a dispersion medium for dispersing the group of particles. The particle for a display (particle for a display according to the present exemplary embodiment) contains a colored particle and a polymer gel layer that is bonded to or coated on the surface of the colored particle so as to cover the surface of the colored particle. The colored particle contains a colorant and a polymer having a chargeable group. The polymer gel layer contains a polymer gel.

The particle for a display according to the present exemplary embodiment moves according to an electric field, has charging characteristics in a state of being dispersed in a dispersion medium, and moves in the dispersion medium according to a generated electric field. The term, "charging characteristics", refers to the charge polarity and the charge amount of the particle.

Plural kinds of particles for a display having different charge polarities can be obtained by, for example, changing the chargeable group of the after-mentioned polymer having a chargeable group.

The particle for a display is described below.

First, the colored particle will be described. The colored particle contains a colorant and a polymer having a chargeable group, and, optionally, another ingredient as necessary.

The polymer having a chargeable group is a polymer containing, for example, a cationic group or an anionic group as a chargeable group. Examples of the cationic group as a chargeable group include an amino group and quaternary ammonium group (including salts of these groups). The cationic group imparts a positively-charging polarity to the particle. Examples of the anionic group as a chargeable group include a phenol group, a carboxyl group, a carboxylate group, a sulfonic acid group, a sulfonate group, a phosphoric acid group, a phosphate group, and a tetraphenyl boron group (including salts of these groups). The anionic group imparts a negatively-charging polarity to the particle, Specifically, the polymer having a chargeable group may be, for example, a homopolymer of a monomer having a chargeable group or a copolymer of a monomer having a chargeable group and another monomer (a monomer having no chargeable group).

Examples of the monomer having a chargeable group include a monomer having a cationic group (hereinafter referred to as a cationic monomer) and a monomer having an anionic group (hereinafter referred to as an anionic monomer).

Examples of the cationic monomer include (meth)acrylic esters having an aliphatic amino group, such as N,N-dimethylaminoethyl(meth)acrylate, N,N-diethylaminoethyl (meth) acrylate, N,N-dibutylaminoethyl(meth)acrylate, N,N-hydroxyethylaminoethyl (meth)acrylate, N-ethylaminoethyl (meth)acrylate, N-octyl-N-ethylaminoethyl(meth)acrylate, and N,N-dihexylaminoethyl(meth)acrylate; aromatic-substituted ethylene monomers having a nitrogen-containing group, such as dimethylaminostyrene, diethylaminostyrene, dimethylaminomethylstyrene, and dioctylaminostyrene; nitrogen-containing vinyl ether monomers, such as vinyl N-ethyl-N-phenylaminoethyl ether, vinyl N-butyl-N-phenylaminoethyl ether, triethanolamine divinyl ether, vinyl diphenylaminoethyl ether, N-vinylhydroxyethylbenzamide, and m-aminophenyl vinyl ether; vinylamine; pyrroles such as N-vinylpyrrole; pyrrolines, such as N-vinyl-2-pyrroline and N-vinyl-3-pyrroline; pyrrolidines, such as N-vinylpyrrolidine, vinylpyrrolidine amino ether, and N-vinyl-2-pyrrolidone; imidazoles, such as N-vinyl-2-methylimidazole; imidazolines, such as N-vinylimidazoline; indoles such as N-vinylindole; indolines such as N-vinyl indoline; carbazoles, such as N-vinylcarbazole and 3,6-dibrom-N-vinylcarbazole; pyridines, such as 2-vinylpyridine, 4-vinylpyridine, and 2-methyl-5-vinylpyridine; piperidines, such as (meth)acrylic piperidine, N-vinyl piperidone, and N-vinylpiperazine; quinolines, such as 2-vinylquinoline and 4-vinylquinoline; pyrazoles, such as N-vinylpyrazole and N-vinylpyrazoline; oxazoles, such as 2-vinyloxazole; and oxazines, such as 4-vinyl oxazine and morpholinoethyl (meth)acrylate.

Examples of cationic monomers that are preferable from the viewpoint of versatility include (meth)acrylates having an aliphatic amino group, such as N,N-dimethylaminoethyl (meth)acrylate and N,N-diethylaminoethyl(meth)acrylate. When any of these compounds are used, the compound may be converted to a quarternary ammonium salt before or after polymerization. Conversion to the quarternary ammonium salt may be carried out by a reaction of the compound with an alkyl halide or a tosylic acid ester.

In contrast, examples of the anionic monomer include the following substances.

Specifically, among anionic monomers, examples of a carboxylic acid monomer include: (meth)acrylic acid, crotonic acid, itaconic acid, maleic acid, fumaric acid, and citraconic acid; anhydrides thereof and monoalkyl esters thereof, and vinyl ethers having a carboxyl group, such as carboxyethyl vinyl ether and carboxypropylvinyl ether.

Examples of a sulfonic acid monomer include: styrenesulfonic acid, 2-acrylamide-2-methylpropanesulfonic acid, 3-sulfopropyl(meth)acrylate, and bis(3-sulfopropyl) itaconate, and salts thereof, and sulfuric monoester of 2-hydroxyethyl(meth)acrylic acid and salts thereof Examples of a phosphoric acid monomer include vinylphosphonic acid, vinyl phosphate, acid phosphoxy ethyl (meth)acrylate, acid phosphoxy propyl(meth)acrylate, bis (methacryloxyethyl)phosphate, diphenyl-2-methacryloyloxy ethyl phosphate, diphenyl-2-acryloyloxyethyl phosphate, dibutyl-2-metacryloyloxyethyl phosphate, dibutyl-2-acryloyloxyethyl phosphate, and dioctyl-2-(meth)acryloyloxyethyl phosphate.

Examples of a preferable anionic monomer include anionic monomers having (meth)acrylic acid or sulfonic acid, and examples of a more preferable anionic monomer include anionic monomers which are converted to an ammonium salt before or after polymerization. The ammonium salt may be produced by a reaction with a tertiary amine or a quaternary ammonium hydroxide.

Examples of another monomer include nonionic monomers. Specific examples thereof include (meth)acrylonitrile, alkyl(meth)acrylate, (meth)acrylamide, ethylene, propylene, butadiene, isoprene, isobutylene, N-dialkyl-substituted (meth)acrylamide, styrene, vinylcarbazole, styrene, styrene derivatives, polyethyleneglycol mono(meth)acrylate, vinyl chloride, vinylidene chloride, isoprene, butadiene, N-vinyl pyrrolidone, hydroxyethyl (meth)acrylate, and hydroxybutyl (meth)acrylate.

Here, the copolymerization ratio of the monomer having a chargeable group to other monomers may be changed according to the desired charge amount of the particles. In general, the copolymerization ratio of the monomer having a chargeable group to other monomers is selected in the range of from 1:100 to 100:0 by molar ratio.

The weight average molecular weight of the polymer having a chargeable group is preferably from 1,000 to 1,000,000, and more preferably from 10,000 to 200,000.

Next, the colorant will be described. The colorant may be selected from, for example, an organic or inorganic pigment or an oil-soluble dye. The colorant may be a known colorant, examples of which include: magnetic powder such as powder of magnetite or ferrite; carbon black; titanium oxide; magnesium oxide; zinc oxide; phthalocyanine copper-based cyan colorants; azo-based yellow colorants; azo-based magenta colorants; quinacridone-based magenta colorants; red colorants; green colorants; and blue colorants. Specifically, typical examples thereof include aniline bule, chalcoil blue, chrome yellow, ultramarine blue, Dupont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3.

The amount of the colorant is preferably from 10% by weight to 99% by weight, and more preferably from 30% by weight to 99% by weight, with respect to a polymer having a chargeable group.

Next, other ingredients will be described. Examples of other ingredients include a charge controlling agent and a magnetic material.

The charge controlling agent may be a known agent used in an electrophotographic toner material. Examples thereof include: quarternary ammonium salts such as cetyl pyridyl chloride and BONTRON P-51, BONTRON P-53, BONTRON E-84, and BONTRON E-81 (manufactured by Orient chemical industry Co., Ltd.); salicylic acid metal complexes; phenol condensates; tetraphenyl compounds; metal oxide particles; and metal oxide particles whose surface has been treated with various coupling agents.

The magnetic material may be an inorganic or organic magnetic material, which may have been color-coated (colored by coating) as required. Transparent magnetic materials, particularly transparent organic magnetic materials, are more preferable because they do not impede coloration by a colored pigment and have smaller specific gravities than those of inorganic magnetic materials.

Examples of the colored magnetic material (color-coated material) include a small-diameter colored magnetic powder described in Japanese Patent Application Laid-Open (JP-A) No. 2003-131420. The colored magnetic material may have a magnetic particle as a core and a colored layer disposed on the surface of the magnetic particle. The colored layer may be, for example, a layer containing a pigment or the like that colors the particle such that the particle becomes opaque. The colored layer may be an optical interference thin film. The optical interference thin film is obtained by forming a colorless material, such as $SiO_2$ or $TiO_2$, into a thin film having a thickness equivalent to the wavelength of light, so that the thin film selectively reflects lights of particular wavelengths by optical interference in the thin film.

Next, the polymer gel layer will be described, which is bonded to or covers the surface of colored particle will be described. The polymer gel layer contains a polymer gel and, optionally, an additive.

Examples of the polymer gel include a crosslinked structure of a homopolymer containing one monomer selected from the following monomer groups and a crosslinked structure of a copolymer containing two or more monomers selected from the following monomer groups. The polymer gel forms a swelling structure that is insoluble in a dispersion medium used in the electrophoresis material. In addition to the crosslinked structures of a polymer or copolymer containing the above-mentioned monomer groups, examples of the polymer gel further include a crosslinked structure of a polyester polymer, a crosslinked structure of a polyvinyl acetal derivative, a crosslinked structure of a polyurethane polymer, a crosslinked structure of a polyurea polymer, a crosslinked structure of a polyether polymer, a crosslinked structure of a polyamide polymer, and a crosslinked structure of a polycarbonate polymer.

—Monomer Group—

Examples of monomers include (meth)acrylonitrile, an alkyl(meth)acrylate, a (meth)acrylate monomer having a silicone chain, a dialkylaminoalkyl(meth)acrylate, (meth)acrylamide, ethylene, propylene, butadiene, isoprene, isobutylene, N-dialkyl-substituted (meth)acrylamide, N-alkyl-substituted (meth)acrylamide, vinylpyridine, vinylamine, allylamine, styrene, vinylcarbazole, N-vinyl pyrrolidone, styrene, a styrene derivative, ethyleneglycol di(meth)acrylate, glyceryl(meth)acrylate, polyethyleneglycol mono(meth)acrylate, vinyl chloride, vinylidene chloride, ethyleneglycol di(meth)acrylate, methylenebis acrylamide, isoprene, butadiene, ethyleneglycol di(meth)acrylate, diethyleneglycol di(meth)acrylate, butanediol di(meth)acrylate, hexanediol di(meth)acrylate, and a silicone-based polyfunctional (meth)acrylate monomer (for example, XX-22-164, XX-22-164AS, XX-22-164A, XX-22-164B, XX-22-164C, and XX-22-164E manufactured by Shin-Etsu Chemical Co., Ltd.). It should be noted that expressions like "(meth)acrylate" refers to either of acrylate or methacrylate or both.

In particular, examples of the polymer gel include crosslinked reactive silicone polymers and crosslinked reactive long-chain alkyl polymers. The polymer gel containing such a crosslinked structure provide particles for a display which may have stable dispersibility and charging characteristics and in which, even in a system containing a mixture of plural kinds of particles for a display having different charge polarities, aggregation between different kinds of particles may be suppressed, compared with the case in which another kind of polymer gel layer is used.

An example of the reactive silicone polymers is a copolymer containing component A (silicone-chain component), component B (reactive component), and component C (another copolymerization component), which are respectively described below.

A. Silicone-Chain Component

Examples of the silicone-chain component include dimethyl silicone monomer having a (meth)acrylate group at one end (e.g., SILAPLANE: FM-0711, FM-0721, and FM-0725 manufactured by Chisso Corp. and X-22-174DX, X-22-2426, and X-22-2475 manufactured by Shin-Etsu Chemical Co., Ltd.).

B. Reactive Component

Examples of the reactive component include glycidyl (meth)acrylates having an epoxy group and isocyanate monomers having an isocyanate group (for example, KARENZ AOI and KARENZ MCI, manufactured by Showa Denko K. K.).

C. Another Copolymerization Component

Examples of another copolymerization component include: alkyl(meth)acrylates such as methyl(meth)acrylate, ethyl(meth)acrylate, propyl(meth)acrylate, and butyl (meth)acrylate; hydroxyethyl(meth)acrylate; hydroxybutyl(meth)acrylate; monomers having an ethylene oxide unit, such as (meth)acrylic ester of an alkyloxy oligoethyleneglycol (such as tetraethyleneglycol monomethyl ether(meth)acrylate); polyethyleneglycol having (meth)acrylate at one end, (meth)acrylic acid; maleic acid; and N,N-dialkylamino (meth)acrylate.

It should be noted that although the components A and B are essential components, the component C is an optional component that may be copolymerized as required. With respect to the copolymerization ratio of the three components, the proportion of the silicone-chain component A is preferably 50 wt % or more, and more preferably 70 wt % or more. When the proportion of the non-silicone-chain components (B+C) is higher than 50 wt %, surface activating ability is decreased, whereby the particle diameter of the produced particles may be increased and/or aggregation of the produced particles may occur easily. The proportion of the reactive component B is preferably in the range of from 0.1 wt % to 20 wt %. When the proportion of the reactive component B is higher than 20 wt %, a reactive group remains in the produced particles for a display, which may cause aggregation of the particles or the like. When the proportion of the reactive component B is lower than 0.1 wt %, there is a possibility that the binding of the polymer gel to the surface of the particles may become insufficient.

Other than the above-mentioned copolymers, the reactive silicone polymer may alternatively be a silicone compound having an epoxy group at one end (silicone compound represented by Structural Formula 1 shown below). Examples of the silicone compound having an epoxy group at one end include X-22-173DX manufactured by Shin-Etsu Chemical Co., Ltd.

Structural Formula 1

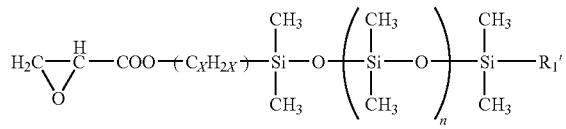

In Structural Formula 1, $R_1'$ represents a hydrogen atom or an alkyl group having 1 to 4 carbon atoms, n is a natural number (for example, from 1 to 1,000, preferably from 3 to 100) and x represents an integer of from 3 to 5.

Among the above, as a reactive silicone polymer, a copolymer is preferable which contains at least two components including (i) a dimethyl silicone monomer having a (meth)acrylate group at one end (a silicone compound represented by Structural Formula 2 shown below: for example, SILAPLANE FM-0711, FM-0721, and FM-0725, manufactured by Chisso Corp., and X-22-174DX, X-22-2426, and X-22-2475 manufactured by Shin-Etsu Silicone Co., Ltd.) and (ii) glycidyl(meth)acrylate or an isocyanate monomer (KARENZ AOI and KARENZ MOI, manufactured by Showa Denko K. K.), from the viewpoint of providing excellent reactivity and surface activating ability.

Structural Formula 2

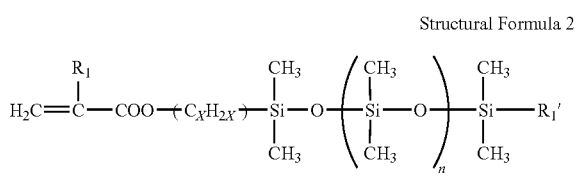

In Structural Formula 2, $R_1$ represents a hydrogen atom or a methyl group, $R_1'$ represents a hydrogen atom or an alkyl group having 1 to 4 carbon atoms, n represents a natural number (for example from 1 to 1,000, preferably from 3 to 100), and x represents an integer of from 3 to 5.

The weight average molecular weight of the reactive silicone polymer is preferably from 500 to 1,000,000, and more preferably 1,000 to 1,000,000.

Examples of the reactive long-chain alkyl polymer include a polymer having a structure similar to that of the silicone copolymer described above but containing, in place of the silicone-chain component A, a long-chain alkyl(meth)acrylate as a long-chain alkyl component A'. As a specific example of the long-chain alkyl(meth)acrylate, a (meth)acrylate is preferable which has an alkyl chain having 4 or more carbon atoms. Examples thereof include butyl(meth)acrylate, hexyl (meth)acrylate, 2-ethylhexyl (meth)acrylate, dodecyl(meth) acrylate, and stearyl(meth)acrylate. Among the above, a copolymer containing at least two components including (i) a long-chain alkyl(meth)acrylate and (ii) glycidyl(meth)acrylate or an isocyanate monomer (IFARENZ AOI and KARENZ MOI, manufactured by Showa Denko K. K.) is preferable from the viewpoint of providing excellent reactivity and surface activating ability. The composition ratio of the components A', B and C in the copolymer may be selected from the same range as the above-described composition ratio range of the reactive silicone polymer (in which the proportion of the component A should be interpreted to mean the proportion of the component A' in this context).

It should be noted that the reactive "long-chain" alkyl polymer refers to, for example, a polymer that has an alkyl chain having 4 to 30 carbon atoms at a side chain.

The weight average molecular weight of the reactive long-chain alkyl polymer is preferably from 1,000 to 1,000,000, and more preferably from 10,000 to 1,000,000.

It is preferable, in terms of dispersibility of particles, that the polymer gel is electrically neutral and does not have a chargeable group that is similar to a chargeable group present on the colored particle; in other words, the polymer gel is preferably formed of a material not containing a chargeable group of the same charging polarity as that of a chargeable group on the colored particle). When a chargeable group is introduced in consideration of, for example, charging characteristics or the like, if different types of colored particles (moving particles) are mixed, it is preferable that the chargeable group in the polymer gel of each kind of particle is the same as each other. This is because, when particles having different types of chargeable groups (functional groups) are mixed, there is a possibility that strong aggregation may occur due to the electrostatic action and reaction thereof Specifically, the polymer gel may be formed of a material not containing the above-mentioned chargeable group such as a cationic group or an anionic group. In particular, it is preferable for the polymer gel layer (the surface of the polymer gel layer) not to have a group that reacts with a functional group present on the surface of another colored particle or a group causing electrostatic interaction. Thus, a particle for a display is provided which may have stable dispersibility and charging characteristics and in which, even in a system containing a mixture of plural kinds of particles for a display having different charge polarities, aggregation between different kinds of particles may be suppressed, compared with the case where the polymer gel layer is formed of a material having a chargeable group.

The polymer gel may be obtained using the above-mentioned polymer (polymer or copolymer) and crosslinking the above-mentioned polymer (polymer or copolymer) three-dimensionally by addition of a crosslinking agent, irradiation of the polymer with radiation rays (e.g., electron beams or γ-rays), heating of the polymer, addition of a peroxide, or the like.

The polymer gel layer containing the polymer gel may also contain another additive. Examples of another additive include particles of a polymer, particles of an inorganic material, or the like.

The polymer gel layer is formed by dispersing colored particles in a solvent in which the polymer (polymer or copolymer) is dispersed or dissolved and three dimensionally crosslinking the polymer (polymer or copolymer) by addition of a crosslinking agent, irradiation of the polymer with radiation rays (e.g., electron beams or γ-rays), heating of the polymer, addition of a peroxide, or the like. It is a matter of course that the polymer gel layer may alternatively be formed while polymerizing the monomer or monomers.

The polymer gel layer may be formed to cover the colored particle in a state in which the polymer gel layer is chemically bonded to the surface of the colored particle, or, alternatively, may be formed to cover the colored particle in a state in which the polymer gel layer is not bonded to the surface of the colored particle. When the polymer gel layer covering the colored particle is chemically bonded to the surface of the colored particle, the polymer gel layer may be formed by, for example, crosslinking a macromolecule (polymer or copolymer) provided with a reactive group (e.g., an epoxy group or an isocyanate group) while the reactive group is bonded to a functional group (which may be the same as the chargeable group mentioned above) present on the surface of the colored particle. The polymer gel layer may be alternatively formed by polymerizing a monomer having a reactive group while the reactive group is bonded to a functional group (which may be the same as the chargeable group mentioned above) present on the surface of colored particle.

The amount of the polymer gel layer (covering the colorant particle) may be in the range of from 1% by weight to 200% by weight with respect to the weight of the colored particle, from the viewpoint of dispersibility. When the amount of the polymer gel layer is smaller than 1% by weight, dispersibility of the particle may be deteriorated. When the amount of the polymer gel layer is higher than 200% by weight, the charge amount of the particle may be decreased.

The amount of the polymer gel layer (covering the colored particle) may be determined as follows. In one method, the produced particle for a display is subjected to centrifugal sedimentation, and the weight of the particle is measured; the amount of the polymer gel layer is calculated as an increase from the weight of the colored particle material. In another method, the amount of the polymer gel layer is calculated from the composition analysis of the particle.

Next, examples of the particle for a display according to the present exemplary embodiment will be described. In the particle for a display according to the present exemplary embodiment, a polymer gel layer may be formed directly on the surface of a colored particle. However, it is preferable for the particle for a display to include, between the colored particle and the polymer gel layer, a non-crosslinked structure of a reactive silicone polymer or a non-crosslinked structure of a non-crosslinked reactive long-chain alkyl polymer, which is bonded to or covers the surface of the colored particle. More specifically, the particle for a display according to the present exemplary embodiment may be, for example, any of the following: 1) a particle for a display in which a reactive silicone polymer is present between a colored particle and a polymer gel layer and is bonded to or covers the surface of the colored particle; and 2) a particle for a display in which a reactive long-chain alkyl polymer present between a colored particle and a polymer gel layer and is bonded to or covers the surface of the colored particle. In these particle forms, the polymer gel may be formed as follows: a colored particle on which a specific reactive dispersant is bonded to or covers the surface of the colored particle is prepared using the specific reactive dispersant as described below; and (i) another polymer is bonded to or allowed to cover the surface via the reactive dispersant on the surface, and is crosslinked, or (ii) a monomer or monomers are polymerized using a functional group contained in the reactive dispersant or a functional group introduced onto the surface of the colored particle.

The reactive silicone polymer or the reactive long-chain alkyl polymer, which are non-crosslinked structures, may be selected from those described above in the description of the polymer gel.

The reactive silicone polymer or the reactive long-chain alkyl polymer is bonded to or covers the surface of colored particle. Here, when used to express the state of the reactive silicone polymer or the reactive long-chain alkyl polymer, the term "bonded" means that a reactive group in the polymer and a functional group (which may be the same as the chargeable group mentioned above) present on the surface of the colored particle are bonded to each other, and the term "cover" refers to a state in which a reactive group in the reactive polymer has undergone a reaction, such as polymerization, due to an action of a functional group on the surface of the colored particle or a chemical substance separately added to the system, thereby forming a layer that is located on and covers the surface of the colored particle. In order to selectively cause either bonding or covering, the following measures may be taken. For example, when a reactive polymer is bonded to the surface of the colored particle, a reactive silicone polymer or reactive long-chain alkyl polymer having a reactive group that is actively bonded to a functional group (chargeable group) as described above is selected; for example, the functional group on the particle may be selected from an acid group, an acid-salt group, a hydroxyl group, an alcoholate group, or a phenolate group, and the reactive group may be selected from an epoxy group or an isocyanate group. When a reactive polymer covers the surface of the colored particle, a reactive silicone polymer or reactive long-chain alkyl polymer in which reactive groups of the polymer are bonded to each other due to an action of a functional group (chargeable group) as a catalyst; for example, the functional group (chargeable group) may be selected from an amino group or an ammonium group, and the reactive group may be an epoxy group.

The reactive silicone polymer or reactive long-chain alkyl polymer may be bonded to, or allowed to cover, the surface of colored particle by heating or the like. The amount of the reactive polymer bonded to or covering the surface of the colored particle may be in the range of from 2% by weight to 200% by weight with respect to the weight of the colored particle, from the viewpoint of dispersibility. When the amount is smaller than 2% by weight, dispersibility of the particle may be deteriorated. When the amount is higher than 200% by weight, the charge amount of the particle may be decreased.

The amount of the reactive polymer bonded to or covering the surface of the colored particle may be determined as follows. In one method, a colored particle having the reactive polymer bonded to or covering the surface thereof is subjected to centrifugal sedimentation, and the weight of the particle is measured; the amount of the reactive polymer is calculated as an increase from the weight of the colored particle material. In another method, the amount of the reactive polymer is calculated from the composition analysis of the particle, Next, a method of producing the particles for a display according to the present exemplary embodiment will be described.

A method of producing the particle for a display according to the present exemplary embodiment may include: stirring and emulsifying a mixed solution containing a polymer having a chargeable group, a colorant, a macromolecule (polymer or copolymer) for forming a polymer gel, a first solvent, and a second solvent which is incompatible with the first solvent, has a lower boiling point than that of the first solvent, and dissolves the polymer having a chargeable group; removing the second solvent from the emulsified mixed solution to generate a colored particle containing the polymer having a chargeable group and the colorant; and crosslinking the macromolecule (polymer or copolymer) for forming a polymer gel to form a polymer gel layer that covers the surface of the colored particle. In particular, when a so-called liquid drying method is used to produce a particle for a display, the resultant particle for a display has stable dispersibility and charging characteristics.

When a reactive silicone polymer or a reactive long-chain alkyl polymer is used as a macromolecule (polymer or copolymer) for forming a polymer gel, a method of producing the particle for a display according to the present exemplary embodiment may include: stirring and emulsifying a mixed solution containing a polymer having a chargeable group, a colorant, a reactive silicone polymer or a reactive long-chain alkyl polymer, a first solvent, and a second solvent which is incompatible with the first solvent, has a lower boiling point than that of the first solvent, and dissolves the polymer having a chargeable group; removing the second solvent from the emulsified mixed solution to generate a colored particle containing the polymer having a chargeable group and the colorant; reacting the reactive silicone polymer or reactive long-chain alkyl polymer so as to allow a non-crosslinked structure of the reactive silicone polymer or a non-crosslinked structure of the reactive long-chain alkyl polymer to be bonded to or cover the surface of the colored particle, and crosslinking the reactive silicone polymer or reactive long-chain alkyl polymer to form a polymer gel layer that covers the surface of the colored particle.

In the method, a dispersion medium to be used in a display medium may be used as the first solvent, so that the obtained dispersion liquid may be used as it is as a particle dispersion liquid for a display containing particles for a display and the dispersion medium. Thus) according to a method of producing the particle for a display according to the present exemplary embodiment, the particle dispersion liquid for a display containing the first solvent as the dispersion medium is easily produced through the above-described processes, without performing cleaning and drying processes. It is a matter of course that cleaning (removal of ionic impurities) of the particle and substitution of the dispersion medium may be optionally performed so as to improve electrical properties. Hereinafter, the respective steps will be described.

It should be noted that the method of producing the particle for a display according to the present exemplary embodiment is not limited to the above production methods. For example, a method may be used which includes: forming a colored particle by a well-known method (such as a liquid drying method, a coacervation method, a dispersion polymerization method, or a suspension polymerization method); dispersing the colored particle in a solvent containing a macromolecule (polymer or copolymer) for forming a polymer gel or containing at least one monomer which is a precursor thereof, and forming a polymer gel layer that covers the surface of the colored particle by allowing the macromolecule (polymer or copolymer) to be bonded to or cover the surface of the colored particle and curing the macromolecule or by polymerizing the at least one monomer (including a crosslinking agent) due to an action of a functional group on the surface of the colored particle.

Details of an example of the method of producing the particle for a display according to the present exemplary embodiment (a method in which a reactive silicone polymer or a reactive long-chain alkyl polymer is used as a macromolecule (polymer or copolymer) for forming a polymer gel) are described below. The respective processes are described below.

—Emulsification Process—

In an emulsification process, for example, two solutions—a solution containing a first solvent and a reactive silicone polymer or reactive long-chain alkyl polymer and a solution containing a polymer having a chargeable group, a colorant, and a second solvent which is incompatible with the first solvent, has a lower boiling point than that of the first solvent, and dissolves the polymer having a chargeable group—are mixed and stirred for emulsification. To the mixed solution to be emulsified, one or more other ingredients (such as a charge controlling agent or a pigment dispersant) other than the above-mentioned materials may be added as required.

In the emulsification process, by stirring the mixed solution, the second solvent having a lower boiling point is emulsified in a continuous phase containing the high-boiling-point solution (first solvent+reactive polymer) so as to form a liquid drop-like dispersed phase. The reactive silicone polymer or reactive long-chain alkyl polymer is dissolved in the continuous phase of the first solvent, and the polymer having a chargeable group and the colorant are dissolved or dispersed in the second solvent.

In the emulsification process, the respective materials may be successively added to and mixed with the mixed solution. In an example of the process, first, a first mixed solution in which the polymer having a chargeable group, the colorant, and the second solvent are mixed and a second mixed solution in which the reactive silicone polymer or reactive long-chain alkyl polymer and the first solvent are mixed are prepared; then, the first mixed solution is dispersed and mixed in the second mixed solution, so that the first mixed solution, in the form of particles, is dispersed and emulsified in the second mixed solution. The second mixed solution may be prepared by adding the monomer or monomers for forming the reactive silicone polymer or reactive long-chain alkyl polymer to the first solvent, and polymerizing the monomer or monomers to form the reactive silicone polymer or reactive long-chain alkyl polymer.

The stirring for emulsification may be carried out, for example using a known stirrer (such as a homogenizer, a mixer, or an ultrasonic crusher). In order to suppress an increase in temperature at the time of emulsification, it is preferable to maintain the temperature of the mixed solution at the time of emulsification in the range of from 0° C. to 50° C. For example, the stirring rate of the homogenizer or mixer for emulsification, the output intensity of the ultrasonic crusher, and the emulsification time may be determined according to a desired particle diameter.

Next, the first solvent will be described.

The first solvent is used as a poor solvent capable of forming a continuous phase in a mixed solution. Examples thereof include, but are not limited thereto, a petroleum-derived high-boiling-point solvent, such as a paraffin hydrocarbon solvent, silicone oil, and a fluorine-containing liquid. In particular, from the viewpoint of obtaining a particle for a display which has stable dispersibility and charging characteristics and in which, even in a system containing a mixture of plural kinds of particles for a display having different charge polarities, aggregation between different kinds of particles is suppressed, the first solvent is preferably a silicone oil when using the reactive silicone polymer and the first solvent is preferably a paraffin hydrocarbon solvent when using the reactive long-chain alkyl polymer.

Specific examples of the silicone oil include a silicone oil in which a hydrocarbon group is bonded to a siloxane bond (for example, dimethyl silicone oil, diethyl silicone oil, methylethyl silicone oil, methylphenyl silicone oil, or diphenyl silicone oil), and a modified silicone oil (for example, a fluorine-modified silicone oil, an amine-modified silicone oil, a carboxyl-modified silicone oil, an epoxy-modified silicone oil, or an alcohol-modified silicone oil). Among the above, dimethyl silicone is preferable in consideration of its high safety, high chemically stability, excellent long-term reliability, and high electric resistance.

The viscosity of the silicone oil is preferably from 0.1 mPa·s to 20 mPa·s, and more preferably from 0.1 mPa·s to 2 mPa·s, under the environment of a temperature of 20° C. By adjusting the viscosity to fall within the range, the moving speed of the particles, i.e., the display speed, may be increased. The viscosity is measured using a B-8 L-type viscometer manufactured by Tokyo Keiki K. K.

Examples of the paraffin hydrocarbon solvent include a normal paraffin hydrocarbon having 20 or more carbon atoms (boiling point of 80° C. or more) and an isoparaffin hydrocarbon having 20 or more carbon atoms (boiling point of 80° C. or more). It is preferable to use an isoparaffin from the viewpoint of, for example, safety and volatility. Specific examples thereof include SHELLSOL 71 (manufactured by Shell Petroleum Co.), ISOPAR O, ISOPAR H, ISOPAR K, ISOPAR L, ISOPAR G, ISOPAR M (ISOPAR is a tradename manufactured by Exxon Co.), and an IP solvent (manufactured by Idemitsu Petrochemical Co., Ltd.).

Next, the second solvent will be described.

The second solvent is used as a good solvent capable of forming a dispersed phase in a mixed solution. The second solvent may be a solvent which is incompatible with the first solvent, has a lower boiling point than that of the first solvent, and dissolves the polymer having a chargeable group. The term "incompatible" refers to a state in which plural substance systems are present as independent phases without being mixed with each other. The term "dissolution" refers to a state in which undissolved matter is not visually confirmed Specific examples of the second solvent include, but are not limited to, water, lower alcohols having 5 or fewer carbon atoms (such as methanol, ethanol, propanol, or isopropyl alcohol), tetrahydrofuran, acetone, other organic solvents (such as toluene, dimethylformamide, or dimethylacetamide), and mixed solvents thereof.

Since the second solvent can be removed from the system of the mixed solution by, for example, heating under reduced pressure, the second solvent may be selected from solvents having a boiling point that is lower than that of the first solvent. The boiling point of the second solvent is preferably from 50° C. to 200° C., and more preferably from 50° C. to 150° C., for example.

—Second Solvent Removal Process—

Next, in a second solvent removal process, the second solvent (lower-boiling-point solvent) is removed from the mixed solution which has been emulsified in an emulsification process. By removing the second solvent, the polymer having a chargeable group is deposited so as to enclose other materials and so as to form particles in the dispersed phase formed by the second solvent, thereby providing colored particles. The polymer that forms the particles may contain various additives, such as a pigment dispersant or a weather resistance stabilizer. For example, commercially available pigment dispersion liquids contain high-molecular-weight substances and/or surfactants for dispersing pigments. When such commercially available pigment dispersion liquids are used in the method described herein, these substances, together with a charge control resin, are contained in the colored particles.

The method of removing the second solvent may be, for example, a method of heating a mixed solution or a method of depressurizing a mixed solution, or a combination of these methods.

When the second solvent is removed by heating the mixed solution, the heating temperature is, for example, preferably from 30° C. to 200° C., and more preferably from 50° C. to 180° C. The reactive silicone polymer or reactive long-chain alkyl polymer may be allowed to react with the surface of the particles by the heating conducted in the process of removing the second solvent. When the second solvent is removed by depressurizing a mixed solution, the decrease in pressure is preferably from 100 Pa to 50K Pa, and more preferably from 100 Pa to 20K Pa.

—Bonding or Covering Process—

In the bonding or covering process, the reactive silicone polymer or reactive long-chain alkyl polymer is reacted to be bonded to, or cover, the surface of the colored particles in the solution (first solvent) containing the generated colored particles. Although there is a possibility that the reaction may proceed by heat treatment conducted in the process of removing the second solvent, the reaction proceeds with higher certainty when the bonding or covering process is conducted.

The method of reacting the polymer so as to bond the polymer to the surface of the colored particles or so as to allow the polymer to cover the surface of the colored particles, may be selected depending on the type of the polymer, and may be, for example, a method of heating the solution.

When the solution is heated, the heating temperature is preferably from 50° C. to 200° C., and more preferably from 60° C. to 150° C.

—Polymer Gel Layer Formation Process—

In the process for forming a polymer gel layer, after the bonding or covering process, the reactive silicone polymer or reactive long-chain alkyl polymer that remains unreacted in the solution (first solvent) containing the generated colored particles is crosslinked, or another reactive silicone polymer or reactive long-chain alkyl polymer is newly added and crosslinked, whereby a polymer gel is formed to provide a polymer gel layer. The crosslinking reaction of the reactive silicone polymer or reactive long-chain alkyl polymer may be carried out by, for example, heating; a crosslinking agent may be added as required prior to the heating.

The production method described above is a specific example in which a liquid drying method is used. The formation of the particles and the formation of the polymer gel layer on the surface of the particles may be carried out by a combination of various known methods.

Through the above-described processes, particles for a display, and a particle dispersion liquid for a display containing the same are obtained. To the obtained particle dispersion liquid for a display, one or more substances selected from the following may be added as required: an acid, an alkali, a salt, a dispersant, a dispersion stabilizer, a stabilizer for anti-oxidation, UV absorption, or the like, an antibacterial agent, and an antiseptic agent.

To the obtained particle dispersion liquid for a display, a charge control agent may be added; the charge control agent may be selected from an anionic surfactant, a cationic surfactant, an amphoteric surfactant, a nonionic surfactant, a fluorochemical surfactant, a silicone surfactant, a silicone cationic compound, a silicone anionic compound, a metal soap, an alkyl phosphate, or a succinimide.

Examples of the charge control agent include an ionic or nonionic surfactant, a block or graft copolymer containing a lipophilic part and a hydrophilic part, a compound having a polymer chain skeleton that may be cyclic, star-shaped, or dendriform (dendrimer), a metal complex of salicylic acid, a metal complex of catechol, a metal-containing bisazo dye, a tetraphenyl borate derivative, and a copolymer of a polymerizable silicone macromer (Chisso: SILAPLANE) and an anionic monomer or cationic monomer.

More specific examples of the ionic or nonionic surfactant include the following substances. Examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylol amide. Examples of the anionic surfactant include an alkylbenzene sulfonate, an alkylphenyl sulfonate, an alkylnaphthalene sulfonate, a higher fatty acid salt, a salt of a sulfuric ester of a higher fatty acid, and a sulfonic acid of a higher fatty acid ester. Examples of the cationic surfactant include a primary amine salt, a secondary amine salt, a tertiary amine salt, and a quaternary ammonium salt. The amount of the charge control agent is preferably from 0.01% by weight to 20% by weight, and particularly preferably from 0.05% by weight to 10% by weight, with respect to the solid amount of the particles.

Moreover, the obtained particle dispersion liquid for a display may be diluted, as required, with the first solvent (a first solvent optionally containing a dispersant).

The concentration of the particles for a display in the particle dispersion liquid for a display may be variously selected according to the display characteristics, response characteristics, or application thereof, and is preferably in the range of from 0.1% by weight to 30% by weight. When plural kinds of particles having different colors are mixed, the total amount of the plural kinds of particles is preferably in the above-mentioned range. When the total amount of the particles is lower than 0.1% by weight, the display density may be excessively low, and when the total amount of the particles is more than 30% by weight, the display speed may be decreased or aggregation of the particles is likely to occur.

Use of a mixture of plural kinds of particles having different colors and/or different charge polarities from each other provides a color display.

The particle dispersion liquid for a display according to the present exemplary embodiment may be used for applications such as an electrophoresis display medium, an electrophoresis light-control medium (light-control element), and a liquid toner in a liquid development electrophotographic system. Examples of the electrophoresis display medium or the electrophoresis light-control medium (light-control device) include a known system in which a group of particles is moved in a direction perpendicular to the surface of an electrode (substrate), another system in which a group of particles is moved in a direction parallel to the surface of an electrode (substrate) (a so-called in-plane device), or a hybrid device in which the above methods are combined.

Display Medium and Display Device

Examples of the display medium and the display device according to exemplary embodiments are described below.

First Exemplary Embodiment

Figure 2A:
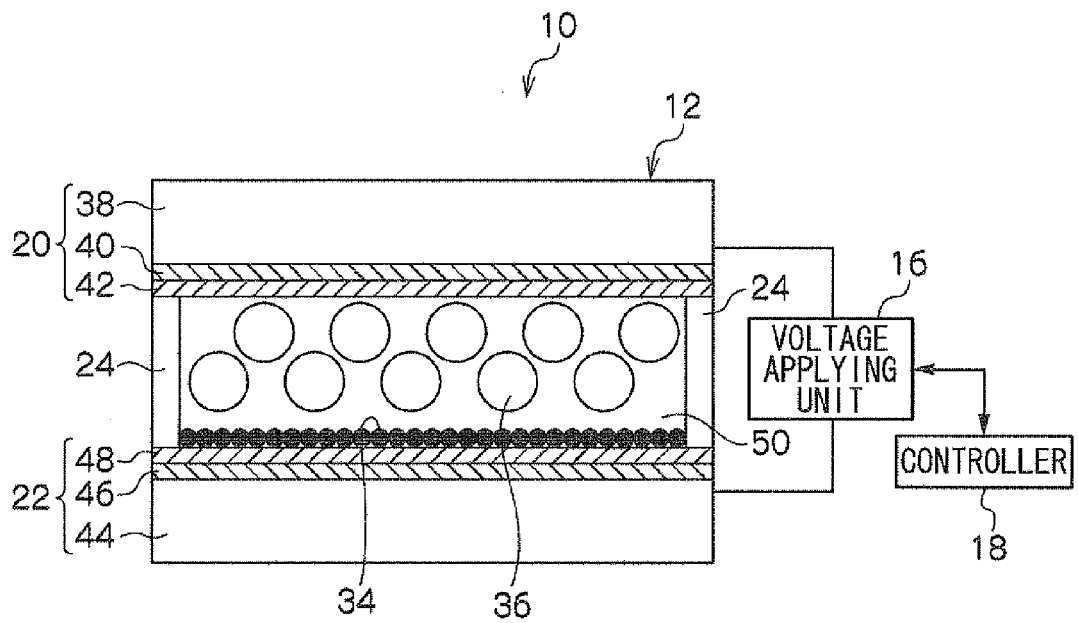
FIGS. 2A and 2B are views schematically illustrating a manner in which a group of particles moves when a voltage is applied between substrates of a display medium of the display device according to the first exemplary embodiment.
Figure 2B:
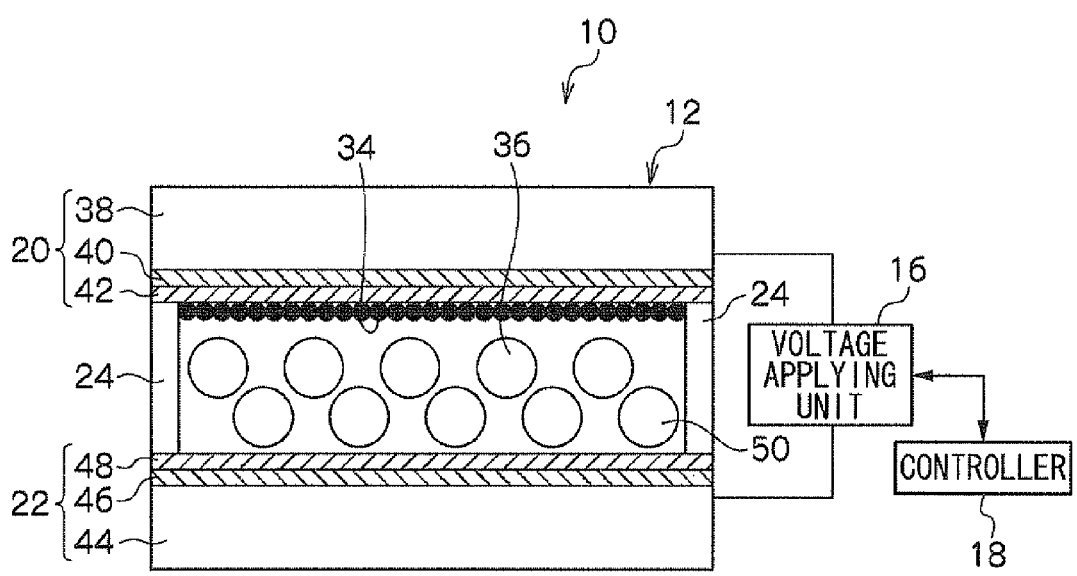

First, a first exemplary embodiment will be described. FIG. 1 is a schematic configuration diagram of a display device according to the first exemplary embodiment. FIGS. 2A and 2B are views schematically illustrating the movement manner of a group of particles when a voltage is applied between substrates of the display medium of the display device according to the first exemplary embodiment. Elements having substantially the same function and action are designated by the same reference numeral throughout the drawings, and overlapping descriptions thereof are sometimes omitted.

In a display device 10 according to the first exemplary embodiment, a particle dispersion liquid for a display according to the exemplary embodiment containing the particles for a display according to the exemplary embodiment and a dispersion medium is used as a particle dispersion liquid containing a dispersion medium 50 and a group of particles 34 in a display medium 12.

The display device 10 according to the first exemplary embodiment contains the display medium 12, a voltage application unit 16 by which a voltage is applied to the display medium 12, and a controller 18, as shown in FIG. 1.

The display medium 12 contains a display substrate 20 serving as an image display surface, a rear substrate 22 facing the display substrate 20 with a space therebetween, spacing member 24 which holds these substrates to maintain a given spacing therebetween and which divides a space between the display substrate 20 and the rear substrate 22 into plural cells, a group of particles 34 enclosed in each cell, and a group of large-diameter colored particles 36 having optical reflection properties different from those of the group of particles 34.

The cell refers to an area surrounded by the display substrate 20, the rear substrate 22, and the spacing member 24. In this cell, the dispersion medium 50 is enclosed. The group of particles 34 (which will be described later in detail) contain plural particles, is dispersed in the dispersion medium 50, and moves, through gaps among the large-diameter colored particles 36, between the display substrate 20 and the rear substrate 22 according to the strength of the electric field formed in the cell.

In the present exemplary embodiment, the description will be given based on an assumption that the group of particles 34 enclosed in one cell has a predetermined color and has been positively or negatively charged in advance.

The display medium 12 may be configured such that pixel-by-pixel display can be realized by forming cells corresponding to respective pixels (of a displayed image on this display medium 12); the cells corresponding to the respective pixels may be formed by providing the spacing member 24 so as to form the cells.

For simplifying the description, the present exemplary embodiment will be described with reference to figures each illustrating one cell. Hereinafter, the respective elements will be described in detail.

First, a pair of substrates will be described. The display substrate 20 has a structure in which a front electrode 40 and a surface layer 42 are disposed, in this order, on a supporting substrate 38. The rear substrate 22 has a structure in which a rear electrode 46 and a surface layer 48 are disposed on a supporting substrate 44.

The display substrate 20 or both the display substrate 20 and the rear substrate 22 have light-transmitting property. The light-transmitting property in the present exemplary embodiment indicates that the transmittance of visible light is 60% or more.

Examples of the supporting substrate 38 and the supporting substrate 44 include a glass or plastic substrate, such as a substrate of polyethylene terephthalate resin, polycarbonate resin, acrylic resin, polyimide resin, polyester resin, epoxy resin, or polyether sulfone resin.

The material of the front electrode 40 or the rear electrode 46 may be an oxide of indium, tin, cadmium, antimony, or the like, a complex oxide such as ITO, a metal such as gold, silver, copper, or nickel, or an organic material such as polypyrrole or polythiophene. These substances may be used to form a single-layer film, a mixed film, or a composite film. The front electrode 40 and the rear electrode 46 each may be formed by, for example, vacuum deposition, sputtering, or coating. The thickness of each electrode is generally from 100 Å to 2,000 Å when vacuum deposition or sputtering is used. The rear electrode 46 and/or the front electrode 40 may be formed into a desired pattern, such as a matrix or a stripe (with which passive matrix driving is possible), by a conventional measure such as etching of a conventional liquid-crystal-display medium or a conventional printed board.

The front electrode 40 may be embedded in the supporting substrate 38. The rear electrode 46 may be embedded in the supporting substrate 44. In this case, materials of the supporting substrate 38 and the supporting substrate 44 may be selected according to the composition or the like of the particles of each particle group 34.

The rear electrode 46 may be separated from the rear substrate 22 so that the rear electrode is located outside of the display medium 12. The front electrode 40 may be separated from the display substrate 20 so that the front electrode 40 is located outside the display medium 12.

Although both the display substrate 20 and the rear substrate 22 are provided with electrodes (the front electrode 40 and the rear electrode 46, respectively) in the above description, it is also possible to provide an electrode to either one of the display substrate 20 or the rear substrate 22 so as to perform active matrix driving.

In order to achieve active matrix driving, the supporting substrate 38 or the supporting substrate 44 may be provided with a TFT (thin film transistor) at each pixel. In consideration of ease of lamination of wiring and component mounting, it is preferable to form a TET on the rear substrate 22 rather than on the display substrate.

When the display medium 12 is configured to be driven by simple-matrix driving, the structure of the after-mentioned display device 10 provided with the display medium 12 can be simplified. When the display medium 12 is configured to be driven by active-matrix driving using a TFT, the display speed may be increased compared with simple matrix driving, Next, the spacing member will be described. When the front electrode 40 and the rear electrode 46 are formed on the supporting substrate 38 and the supporting substrate 44, respectively, the surface layer 42 and the surface layer 48, which are dielectric films, are optionally formed on the front electrode 40 and the rear electrode 46, respectively, so as to prevent breakage of the front electrode 40 and the rear electrode 46 and the electric leakage between the electrodes which causes adherence of the particles of the particle group 34.

Examples of the material forming the surface layer 42 and/or the surface layer 48 include polycarbonate, polyester, polystyrene, polyimide, epoxy, polyisocyanate, polyamide, polyvinyl alcohol, polybutadiene, polymethylmethacrylate, copolymer nylon, ultraviolet curing acrylic resin, and fluororesin.

The material for the surface layer 42 or the surface layer 48 is not limited to the above-described insulating materials, and may be a material obtained by incorporating a charge transporting substance into an insulating material. The incorporation of a charge transporting substance may produce effects of, for example, increasing particle chargeability upon injection of a charge into the particles and stabilizing the charge amount through leakage of the charge of the particles at the time the charge amount of the particles excessively increases.

Examples of the charge transporting substance include hydrazone compounds, stilbene compounds, pyrazoline compounds, and arylamine compounds, which are hole transporting substances; fluorenone compounds, diphenoquinone derivatives, pyrane compounds, and zinc oxides, which are electron transporting substances; and a self-supporting resin having charge transporting properties.

Specific examples thereof include polyvinylcarbazole and polycarbonate obtained by polymerization of a specific dihydroxyarylamine and bischloroformate, such as those described in U.S. Pat. No. 4,806,443. The dielectric film may be suitably selected according to the composition or the like of the particles because the dielectric film sometimes exerts influence on the charging characteristics and fluidity of the particles. The display substrate, which is one of the substrates, transmits light. Thus, the display substrate may be selected from transparent materials among the above-described materials.

Next, the spacing member will be described. The spacing member 24 for maintaining the space between the display substrate 20 and the rear substrate 22 is configured such that the light-transmitting property of the display substrate 20 may not be impaired. The spacing member 24 may be formed of, for example, a thermoplastic resin, a thermosetting resin, an electron beam a curable resin, a photo-curable resin, a rubber, or metal.

The spacing member 24 may be integrated with either one of the display substrate 20 or the rear substrate 22. In such a case, the spacing member 24 may produced by, for example, subjecting the display substrate 20 or the rear substrate 22 to etching, laser processing, press forming using a mold that was produced in advance, or printing.

In this case, the spacing member 24 may be formed at either the display substrate 20 side or the rear substrate 22 side, or both.

The spacing member 24 may be colored or colorless, and is preferably colorless and transparent in order not to cause adverse effects on an image displayed on the display medium 12. In such a case, the spacing member may include a transparent resin, such as polystyrene, polyester, or an acrylic resin.

The spacing member 24, when they are in the form of particles, may be transparent; in this case, the spacing member 24 may include a glass particle or a transparent resin particle such as a particle of polystyrene, polyester, or an acrylic resin.

The term "transparent" indicates that the substance has a transmittance of 60% or more to visible light.

Next, the group of large-diameter colored particles will be described. The group of large-diameter colored particles 36 is a group of particles which are not charged, which are large-particle-diameter colored particles having optical reflective characteristics different from those of the particle group 34, and which function as a reflection member that displays a color different from that of the particle group 34. The group of large-diameter colored particles 36 also has a function as a cavity member through which the particles 34 move between the display substrate 20 and the rear substrate 22 without being impeded by the large-diameter colored particles 36. More specifically, each particle of the particle group 34 is made to move from the rear substrate 22 side to the display substrate 20 side or from the display substrate 20 side to the rear substrate 22 side through the gaps among the large-diameter colored particles 36. The color of the group of large-diameter colored particles 36 may be, for example, white or black so as to serve as a background color. Although the description is given assuming that the large-diameter colored particles 36 are white in the present exemplary embodiment, the color thereof is not limited thereto.

The large-diameter colored particles 36 may be, for example, particles in which a white pigment such as titanium oxide, silicon oxide, or zinc oxide has been dispersed in polystyrene, polyethylene, polypropylene, polycarbonate, PMMA, acrylic resin, phenol resin, a formaldehyde condensate, or the like. When the large-diameter colored particles 36 are non-white particles, they may be particles in which a pigment or dye of a desired color is included in the above-mentioned resin particles. As the pigment or dye, common pigments or dyes currently used for printing inks or color toners may be used insofar as they have, for example, RGB colors or YMC colors.

The large-diameter colored particles 36 are enclosed in the space between the substrates by, for example, an ink jet method. In order to immobilize the large-diameter colored particles 36, for example, after the large-diameter colored particles 36 are enclosed, the large-diameter colored particles 36 are heated (and optionally pressurized) so that the surface layer of the group of large-diameter colored particles 36 is melted; as a result, the large-diameter colored particles 36 are immobilized with the gaps between the particles maintained.

The dimension of the cell in the display medium 12 closely relates to the resolution of the display medium 12. When the cell is smaller, the produced display medium 12 can display an image of a higher resolution. In general, the length in the substrate surface direction of the display substrate 20 of the display medium 12 (the length of the cell) is from about 10 μm to about 1 mm.

The display substrate 20 and the rear substrate 22 may be fixed to each other via the spacing member 24, using a bolt and a nut may in combination, or using a fixing member such as a clamp, a clip, or a frame for fixing a substrate, or using an adhesive, thermal melting, or ultrasonic bonding.

The display medium 12 thus structured may be used for a bulletin board, a circular bulletin, an electronic blackboard, an advertisement, a signboard, a flashing sign, electronic paper, an electronic newspaper, an electronic book, a document sheet usable with both a copying machine and a printer, and the like, each of which allows storage and rewriting of an image.

As described above, the display device 10 according to the present exemplary embodiment contains the display medium 12, a voltage applying unit 16 which applies a voltage to the display medium 12, and a controller 18 (see FIG. 1).

The voltage applying unit 16 is electrically connected to the front electrode 40 and the rear electrode 46. In the present exemplary embodiment, the description is given assuming that both the front electrode 40 and the rear electrode 46 are electrically connected to the voltage applying unit 16. However, the structure is not limited thereto, and may be a structure in which one of the front electrode 40 or the rear electrode 46 is grounded and the other one of the front electrode 40 or the rear electrode 46 is connected to the voltage applying unit 16.

The voltage applying unit 16 is connected to the controller 18 such that the voltage applying unit 16 can transmit a signal to the controller 18 and receive a signal from the controller 18.

The controller 18 may be configured as a microcomputer containing a CPU (central processing unit) which manages the operation of the whole apparatus, a RAM (Random Access Memory) which temporarily stores various data, and a ROM (Read Only Memory) in which various programs, such as a control program for controlling the whole apparatus, are stored in advance.

The voltage applying unit 16 is a voltage applying device that applies a voltage to the front electrode 40 and the rear electrode 46, and applies a voltage, according to the control of the controller 18, between the front electrode 40 and the rear electrode 46.

Next, the action of the display device 10 will be described. The action will be described according to the operation of the controller 18.

In the description below, it is assumed that the particles 34 enclosed in the display medium 12 are black and are negatively charged, that the dispersion medium 50 is transparent, and that the large-diameter colored particles 36 are white. More specifically, in the present exemplary embodiment, the description is given to a case in which the display medium 12 displays black or white according to the movement of the particles 34.

First, an initial action signal which instructs a voltage to be applied for a given time such that the front electrode 40 becomes a negative electrode and the rear electrode 46 becomes a positive electrode is output to the voltage applying unit 16. When a voltage which has such a polarity and which is equal to or higher than a threshold voltage at which concentration change is completed is applied between the substrates, the negatively-charged particles 34 move to the rear substrate 22 side to reach the rear substrate 22 (see FIG. 2A).

In this state, the color of the display medium 12 visually recognized from the display substrate 20 side is white, which is the color of the large-particle-diameter colored particles 36.

The time T1 may be stored beforehand in, for example, a memory (not shown) such as ROM in the controller 18 as information indicating a voltage application time in the voltage application in the initial action. Then, when the process is carried out, the information indicating the predetermined time may be read out.

Next, a voltage is applied between the front electrode 40 and the rear electrode 46 at a polarity that is opposite to the polarity of the voltage applied in the initial action; in other words, the front electrode 40 becomes a positive electrode and the rear electrode 46 becomes a negative electrode this time. As a result, the particles 34 move towards the display substrate 20 side and reach the display substrate 20 side, whereby black, which is the color of the particles 34, is displayed as shown in FIG. 2B.

Second Exemplary Embodiment

Figure 3:
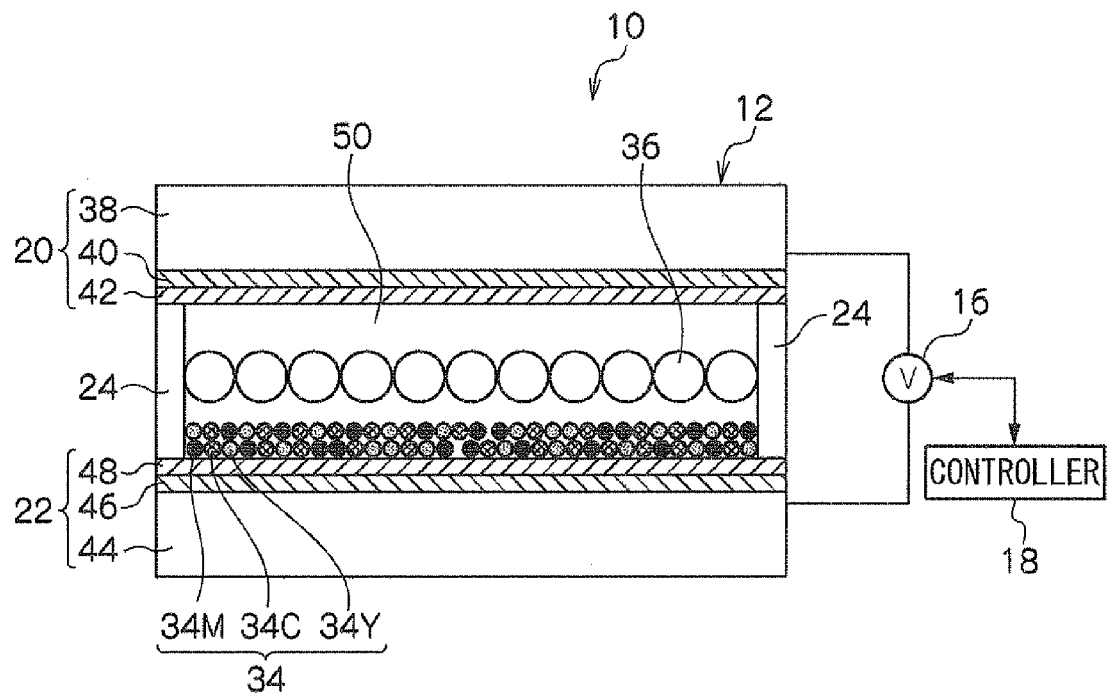
FIG. 3 is a schematic configuration diagram of a display device according to a second exemplary embodiment.
Figure 4:
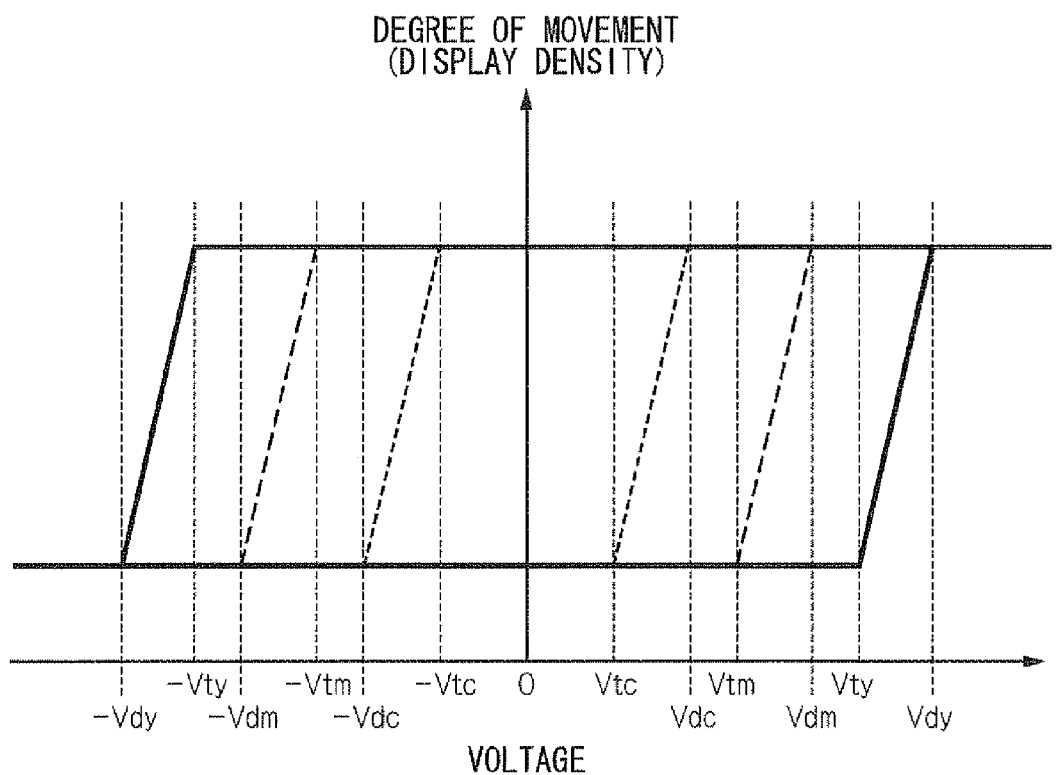
FIG. 4 is a diagram schematically illustrating the relationship between an applied voltage and the degree of the movement (display density) of particles in the display device according to the second exemplary embodiment.

A display device according to the second exemplary embodiment is described below. FIG. 3 is a schematic configuration diagram of the display device according to the second exemplary embodiment. FIG. 4 is a diagram schematically illustrating the relationship between a voltage to be applied and the degree of movement (display density) of particles in the display according to the second exemplary embodiment. FIGS. 5A to 5H are views schematically illustrating the relationship between an application manner of a voltage applied between the substrates of the display medium and the movement manner of particles in the display device according to the second exemplary embodiment.

A display device 10 according to the second exemplary embodiment has a configuration in which two or more kinds of particle groups are applied. The two or more kinds of particle groups are charged with the same polarity.

The display device 10 according to the present exemplary embodiment contains a display medium 12, a voltage applying unit 16 which applies a voltage to the display medium 12, and a controller 18, as shown in FIG. 3.

The display device 10 according to the present exemplary embodiment has a structure similar to that of the display device 10 described in the first exemplary embodiment above. Thus, the same elements are designated by the same reference numeral and detailed description therefor is omitted.

The display medium 12 contains a display substrate 20 serving as an image display surface, a rear substrate 22 facing the display substrate 20 with a gap therebetween, a spacing member 24 which holds these substrates to maintain a given spacing therebetween and divides the space between the display substrate 20 and the rear substrate 22 into plural cells, a group of particles 34 enclosed in the respective cells, and a group of large-diameter colored particles 36 enclosed in the respective cells and having optical reflective properties different from those of the particles 34.

In the present exemplary embodiment, the particles 34 include plural kinds of particle groups that are different in color from each other and are dispersed in the dispersion medium 50.

In the present exemplary embodiment, description is given assuming that the particles 34 include three kinds of particle groups 34 having different colors from each other; namely yellow particles 34Y having a yellow color, magenta particles 34M having a magenta color, and cyan particles 34C having a cyan color are dispersed. However, the number of the kinds of the particles 34 is not limited to three.

The plural kinds of particle groups 34 are particle groups which electrophoretically move between the substrates, and the absolute value of the voltage required for moving the particles according to the electric field is different among the respective particle groups having the respectively different colors. More specifically, each of the particle groups 34 having the different colors (yellow particle group 34Y, magenta particle group 34M, and cyan particle group 34C) has a voltage range required for moving the particle group 34, and the voltage ranges of the respective particle groups are different from each other.

In the preparation of the particles of each kind of the plural kinds of particles 34 that are different in the absolute value of a voltage required for moving according to an electric field, particle dispersion liquids are prepared; the charge amount per particle of particles contained in the respective particle dispersion liquids is varied between dispersion liquids by, for example, changing the amount of, for example, at least one of the charge control agent or the magnetic powder among the materials forming the particles 34 described in the first exemplary embodiment and/or changing the type and the concentration of the resin forming the particles. The prepared particle dispersion liquids are then mixed with each other.

As described above, three kinds of particle groups 34—the yellow particle group 34Y, the magenta particle group 34M, and the cyan particle group 34C having different colors from each other—are dispersed in the display medium 12 according to the present exemplary embodiment. In the plural kinds of particle groups 34, the absolute value of the voltage required for moving according to an electric field is varied between particle groups having the different colors.

In the present exemplary embodiment, regarding the absolute values of the voltages at which the respective particle groups of three colors start moving, the absolute value of the voltage at which the magenta particles 34M in magenta start moving is designated as "|Vtm|", the absolute value of the voltage at which the cyan particles 34C in cyan start moving is designated as "|Vtc|", and the absolute value of the voltage at which the yellow particles 34Y in yellow start moving is designated as "|Vty|". Moreover, regarding the absolute value of the maximum voltage for moving almost all the particles of each of the particle groups having three colors, the absolute value of the maximum voltage for moving almost all the magenta particles 34M in magenta is designated as "|Vdm|", the absolute value of the maximum voltage for moving almost all the cyan particles 34C in cyan move is designated as "|Vdc|", and the absolute value of the maximum voltage for moving almost all the yellow particles 34Y in yellow move is designated as "|Vdy|".

The description is given based on an assumption that the absolute values of Vtc, −Vtc, Vdc, −Vdc, Vtm, −Vtm, Vdm, −Vdm, Vty, −Vty, Vdy, and −Vdy described below satisfy the relationship, |Vtc|<|Vdc|<|Vtm|<|Vdm|<|Vty|<|Vdy|.

Specifically, as shown in FIG. 4, the three kinds of particles 34 are, for example, dispersed in a dispersion medium 50 and are all charged with the same polarity. When the absolute value of a voltage required for moving the cyan particles 34C is designated as "Vc", the absolute value of a voltage required for moving the magenta particles 34M is designated as |Vm|, and the absolute value of a voltage required for moving the yellow particles 34Y is designated as "Vy", the range of the absolute value of Vc (|Vtc|≦Vc≦Vdc|; the absolute value of a voltage between Vtc and Vdc (inclusive)) is at a lower voltage side of the range of the absolute value of Vm (|Vtm|≦Vm|≦Vdm|; the absolute value of a voltage between Vtm and Vdm (inclusive)) without overlap therebetween, and the range of the absolute value of Vm (|Vtm|≦Vm|≦Vdm|; the absolute value of a voltage between Vtm and Vdm (inclusive)) is at a lower voltage side of the range of the absolute value of Vy (|Vty|≦Vy|≦Vdy|; the absolute value of a voltage between Vty and Vdy (inclusive)) without overlap therebetween.

In order to independently drive the respective particle groups 34 having the different colors, the absolute value |Vdc| of the maximum voltage for moving almost all the cyan particles 34C is smaller than the range of the absolute value of a voltage required for moving the magenta particles 34M (|Vtm|≦Vm|≦Vdm|; the absolute value of a voltage between Vtm and Vdm (inclusive)) and the range of the absolute value of a voltage required for moving the yellow particles 34Y (|Vty|≦Vy|≦Vdy|; the absolute value of a voltage between Vty and Vdy (inclusive)). The absolute value |Vdm| of the maximum voltage for moving almost all the magenta particle groups 34M is smaller than the range of the absolute value of a voltage required for moving the yellow particles 34Y (|Vty|≦Vy|≦Vdy|; the absolute value of a voltage between Vty and Vdy (inclusive)).

More specifically, in the present exemplary embodiment, the respective voltage ranges required for moving the respective particle groups 34 having the different colors are controlled so as not to overlap with each other, so that the particle groups 34 having the different colors are independently driven.

The "voltage range required for moving the particles 34" refers to a voltage range from a voltage required for the particles to start moving to a voltage at which the display density ceases to be changed even by increasing the voltage and the voltage application time from initiation of the move, and is saturated.

The "maximum voltage required for moving almost all the particles 34" refers to a voltage at which the display density ceases to be changed even by increasing the voltage and the voltage application time from initiation of the move, and is saturated.

The "almost all" refers to presence of some of the particles 34 having such properties as not to contribute to display properties, which occur due to variation within the particle group of a particular color. When "almost all the particle 34 move", the particles are in a state in which the display density ceases to be changed even by increasing the voltage and the voltage application time from initiation of the move, and is saturated.

The "display density" refers to a color density on the display surface side measured by a reflection density manufactured by X-rite while a voltage is applied between the display surface side and the rear side; the color density is measured as an optical density (OD).

In the display medium 12 according to the present exemplary embodiment, when a voltage applied between the display substrate 20 and the rear substrate 22 is gradually increased from 0 V and exceeds +Vtc, the display density starts to change due to the move of the cyan particles 34C in the display medium 12. When the voltage applied between the substrates is further increased to +Vdc, the change in display density due to the move of the cyan particles 34C stops in the display medium 12.

When the voltage applied between the display substrate 20 and the rear substrate 22 is further increased to exceed +Vtm, the display density starts to change due to the move of the magenta particles 34M in the display medium 12. When the voltage applied between the display substrate 20 and the rear substrate 22 is further increased to +Vdm, the change in display density due to the move of the magenta particles 34M stops in the display medium 12.

When the voltage applied between the substrates is further increased to exceed +Vty, the display density starts to change due to the move of the yellow particles 34Y in the display medium 12. When the voltage applied between the substrates is further increased to +Vdy, the change in display density due to the move of the yellow particles 34Y stops in the display medium 12.

In contrast, when a negative voltage is applied between the display substrate 20 and the rear substrate 22 and the absolute value thereof is gradually increased from 0 V to exceed the absolute value of −Vtc, the display density starts to change due to the move of the cyan particles 34C between the substrates in the display medium 12. When the absolute value of the voltage is further increased and the voltage applied between the display substrate 20 and the rear substrate 22 becomes −Vdc, the change in display density due to the move of the cyan particles 34C stops in the display medium 12.

When the absolute value of the negative voltage applied between the display substrate 20 and the rear substrate 22 is further increased to exceed the absolute value of −Vtm, the display density starts to change due to the move of the magenta particles 34M in the display medium 12. When the absolute value of the voltage is further increased and the voltage applied between the display substrate 20 and the rear substrate 22 becomes −Vdm, the change in display density due to the move of the magenta particles 34M stops in the display medium 12.

When the absolute value of the negative voltage applied between the substrates is further increased to exceed the absolute value of −Vty, the display density starts to change due to the move of the yellow particles 34Y in the display medium 12. When the absolute value of the voltage is further increased and the voltage applied between the substrates becomes −Vdy, the change in display density due to the move of the yellow particles 34Y stops in the display medium 12.

More specifically, in the present exemplary embodiment, when a voltage within the range of from −Vtc to +Vtc (voltage range of |Vtc| or lower) is applied between the display substrate 20 and the rear substrate 22, it is considered that the particles of the particle groups 34 (cyan particles 34C, magenta particles 34M, and yellow particles 34Y) do not move to such a degree as to change the display density of the display medium 12 as shown in FIG. 4. When a voltage higher (in terms of absolute value) than the voltage +Vtc or |Vtc is applied between the substrates, the cyan particles 34C among the particle groups 34 having three colors start to move to such a degree as to change the display density of the display medium 12, so that the display density starts to change. When a voltage higher (in terms of absolute value) than the voltage |Vdc or Vdc is applied, there occurs no change in display density.

When a voltage within the range of from −Vtm to +Vtm (voltage range of |Vtm| or lower) is applied between the display substrate 20 and the rear substrate 22, it is considered that the magenta particles 34M and the yellow particles 34Y do not move to such a degree as to change the display density of the display medium 12. When a voltage higher (in terms of absolute value) than the voltage +Vtm or −Vtm is applied between the substrates, the magenta particles 34M among the magenta particles 34M and the yellow particle groups 34Y start to move to such a degree as to change the display density of the display medium 12, so that the display density starts to change. When a voltage higher (in terms of absolute value) than the voltage −Vdm or Vdm is applied, there occurs no change in display density.

When a voltage within the range of from −Vty to +Vty (voltage range of |Vty| or lower) is applied between the display substrate 20 and the rear substrate 22, it is considered that the yellow particles 34Y do not move to such a degree as to change the display density of the display medium 12. When a voltage higher (in terms of absolute value) than the voltage +Vty or −Vty is applied between the substrates, the yellow particles 34M start to move to such a degree as to change the display density of the display medium 12, so that the display density starts to change. When a voltage higher (in terms of absolute value) than the voltage −Vdy or Vdy is applied, there occurs no change in display density.

Figure 5:
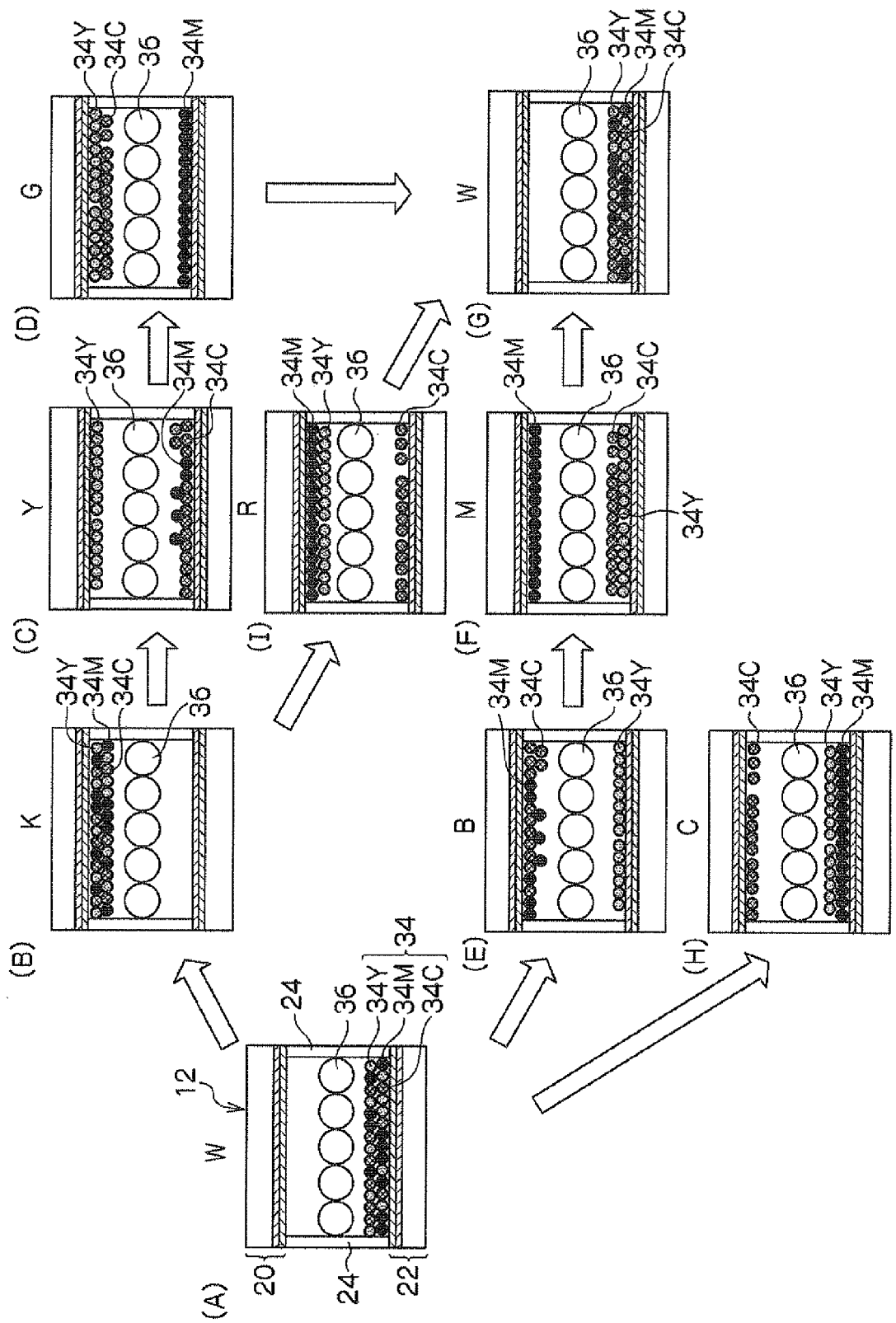
FIG. 5 is a view schematically illustrating the relationship between a manner of application of a voltage between the substrates of the display medium and a manner of particles movement.

Next, the mechanism of the movement of the particles when an image is displayed on the display medium 12 will be described with reference to FIG. 5.

The following description will be given, as an example, based on an assumption that the yellow particles 34Y, the magenta particles 34M, and the cyan particles 34C, which are described above with reference to FIG. 4, are enclosed as the plural kinds of particles 34 in the display medium 12.

In the following description, a voltage to be applied to the substrates which is higher than the absolute value of the voltage required for starting the move of the particles of the yellow particle group 34Y but is equal to or lower than the above-mentioned maximum voltage for the yellow particle group 34Y is referred to as a "large voltage", a voltage to be applied to the substrates which is higher than the absolute value of the voltage required for starting the move of the particles of the magenta particle group 34M but is equal to or lower than the maximum voltage for the magenta particle group 34M is referred to as a "medium voltage", and a voltage to be applied to the substrates which is higher than the absolute value of the voltage required for starting the move of the particles of the cyan particle group 34C but is equal to or lower than the maximum voltage for the magenta particle group 34C is referred to as a "small voltage".

When a voltage is applied between the substrates such that the display substrate 20 side has a higher electric potential than that of the rear substrate 22 side, the respective voltages mentioned above are referred to as a "+large voltage", a "+medium voltage", and a "+small voltage", respectively. When a voltage is applied between the substrates such that the rear substrate 22 has a higher electric potential than that of the display substrate 20, the respective voltages mentioned above are referred to as a "−large voltage", a "−medium voltage", and a "−small voltage", respectively.

As shown in FIG. 5(A), in this example of the process, it is assumed that all the particle groups—the magenta particle group 34M, the cyan particle group 34C, and the yellow particle group 34Y—are located at the side of the rear substrate 22 in the initial state to display a white color. Starting from this initial state, when a "+large voltage" is applied between the display substrate 20 and the rear substrate 22, all of the particle groups—the magenta particle group 34M, the cyan particle group 34C, and the yellow particle group 34Y—move to the display substrate 20 side. Even when the application of voltage is stopped in this state, the respective particle groups remain attached to the side of the display substrate 20 and do not move, so that display of black continues due to subtractive color mixture of the magenta particle group 34M, the cyan particle group 34C, and the yellow particle group 34Y (subtractive color mixture of magenta, cyan, and yellow, see FIG. 5(B)).

Next, when a "−medium voltage" is applied between the display substrate 20 and the rear substrate 22 in the state shown in FIG. 5(B), the magenta particle group 34M and the cyan particle group 34C among the particle groups 34 of all the colors move to the rear substrate 22 side. Therefore, only the yellow particles 34Y remain attached to the display substrate 20 side, so that a yellow color is displayed (see FIG. 5(C)).

When a "small voltage" is applied between the display substrate 20 and the rear substrate 22 in the state shown in FIG. 5(C), the cyan particle group 34C among the magenta particle group 34M and the cyan particle group 34C, which have moved to the rear substrate 22 side, moves to the display substrate 20 side. Therefore, only the yellow particle group 34Y and the cyan particle group 34C are attached to the display substrate 20 side, so that a green color is displayed due to subtractive color mixture of yellow and cyan (see FIG. 5(D)).

When a "−small voltage" is applied between the display substrate 20 and the rear substrate 22 in the state shown in FIG. 5(B), the cyan particle group 34C among all the particle groups 34 moves to the rear substrate 22 side. Therefore, the yellow particle group 34Y and the magenta particle group 34M are attached to the display substrate 20 side, so that a red color is displayed due to subtractive color mixture of yellow and magenta (see FIG. 5(I)).

When a "+medium voltage" is applied between the display substrate 20 and the rear substrate 22 in the initial state shown in FIG. 5(A), the magenta particle group 34M and the cyan particle group 34C among all the particle groups 34 (magenta particle group 34M, cyan particle group 34C, and yellow particle group 34Y) move to the display substrate 22 side. Therefore, the magenta particle group 34M and the cyan particle group 34C are attached to the display substrate 20 side, so that a blue color is displayed due to subtractive color mixture of magenta and cyan (see FIG. 5(E)).

When a "−small voltage" is applied between the display substrate 20 and the rear substrate 22 in the state shown in FIG. 5(E), the cyan particle group 34C among the magenta particle group 34M and the cyan particle group 34C attached to the display substrate 20 side move to the rear substrate 22 side.

Therefore, only the magenta particle group 34M is attached to the display substrate 20 side, so that a magenta color is displayed (see FIG. 5(F)).

When a "−large voltage" is applied between the display substrate 20 and the rear substrate 22 in the state shown in FIG. 5(F), the magenta particle group 34M attached to the display substrate 20 side moves to the rear substrate 22 side.

Therefore, nothing is attached to the display substrate 20 side, so that a white color, which is the color of the large-diameter colored particles 36, is displayed (see FIG. 5(G)).

When a "+small voltage" is applied between the display substrate 20 and the rear substrate 22 in the initial state shown in FIG. 5(A), the cyan particle group 34C among all the particle groups 34 (magenta particle group 34M, cyan particle group 34C, and yellow particle group 34Y) moves to the display substrate 20 side. Therefore, the cyan particle group 34C is attached to the display substrate 20 side, so that a cyan color is displayed (refer to FIG. 5(H)).

When a "−large voltage" is applied between the display substrate 20 and the rear substrate 22 in the state shown in FIG. 5(I), all the particle groups 34 gather at the rear substrate 22 side as shown in FIG. 5(G). Thus, a white color is displayed.

Similarly, when a "−large voltage" is applied between the display substrate 20 and the rear substrate 22 in the state shown in FIG. 5(D), all the particle groups 34 gather at the rear substrate 22 side as shown in FIG. 5(G). Thus, a white color is displayed.

In the present exemplary embodiment, application of a voltage specified for the respective particle groups 34 between the substrates causes selective movement of desired particles according to an electric field generated by the voltage. Thus, the movement of particles having colors other than the desired colors in the dispersion medium 50 may be suppressed, mixture of colors caused by intermingling of a color other than the desired color may suppressed, and a color display may performed while suppressing deterioration of image quality of the display medium 12. As long as the absolute values of voltages required for moving the respective particle groups 34 according to an electric field are respectively different from each other, a clear color display is achieved even when the respective required voltage ranges for moving according to an electric field mutually overlap. When the voltage ranges are different from each other without overlap, a color display may be achieved while further suppressing intermingling of colors.

By dispersing the particle groups 34 having three colors of cyan, magenta, and yellow in the dispersion medium 50, cyan, magenta, yellow, blue, red, green, and black colors may be displayed; further, display of a particular color is achieved, for example by displaying a white color using white large-diameter colored particles 36, Thus, also in the display device 10 according to the present exemplary embodiment, display is performed by movement and attachment of the particles 34 to the display substrate 20 or the rear substrate 22, as in the display device 10 in the first exemplary embodiment above.

EXAMPLES

Hereinafter, the present invention will be more specifically described with reference to Examples.

Example 1

—Preparation of Reactive Silicone Polymer A—

First, 95 parts by weight of SILAPLANE FM-0711 (manufactured by Chisso Corp.), which is a silicone monomer, and 5 parts by weight of glycidyl methacrylate are mixed with 100 parts by weight of dimethyl silicone oil (KF-96L 2cs, manufactured by Shin-Etsu Silicone Co., Ltd.). 0.5 part by weight of azobisvaleronitrile (V-65, manufactured by Wako Pure Chemical Ind. Ltd.) is added as a polymerization initiator, and polymerization is carried out at 55° C. for 10 hours, producing a reactive silicone polymer A (reactive dispersant) having an epoxy group. The weight average molecular weight is 800,000. Then, the reactive silicone polymer A is diluted with dimethyl silicone oil (KF-96L 2cs, manufactured by Shin-Etsu Silicone Co., Ltd.), thereby preparing a 3% by weight silicone oil solution of the reactive silicone polymer A.

—Preparation of Particle Dispersion Liquid for a Display—

Next, a 10% by weight aqueous solution of polymethacrylic acid (weight average molecular weight of 50,000), which is a commercially-available polymer having a chargeable group (manufactured by Wako Pure Chemical Ind. Ltd.), is prepared. Next, 3 parts by weight of the 10% by weight aqueous solution of polymethacrylic acid and 0.36 part by weight of triethylamine are mixed with 1 part by weight of a water-dispersed pigment solution (UNISPERSE magenta color: pigment concentration is 16% by weight) manufactured by Ciba. The mixed solution is mixed with 10 parts by weight of the 3% by weight silicone oil solution of the reactive silicone polymer A. The mixture is stirred for 10 minutes by an ultrasonic crusher (UH-600S, manufactured by SMT Inc.), thereby preparing a suspension in which an aqueous solution containing the polymer having a chargeable group and the pigment is dispersed and emulsified in the silicone oil.

Next, this suspension is depressurized (2 KPa) and heated (70° C.) for 1 hour to remove the moisture, whereby a silicone oil dispersion liquid in which magenta colored particles containing the polymer having a chargeable group and the pigment are dispersed in the silicone oil is obtained. The dispersion liquid is heated at 100° C. for 3 hours, whereby the reactive silicone polymer A (non-crosslinked structure) is reacted with and bonded to the surface of the colored particles.

Next, to the silicone oil dispersion liquid after the reactive silicone polymer A is reacted with the surface of the colored particles, 0.2 part by weight of triethylamine is added as an epoxy polymerization catalyst (crosslinking agent). The mixture is heated at 100° C. for 3 hours, so as to crosslink unreacted reactive silicone polymer A remaining and coexisting in the dispersion liquid. Thus, a silicone polymer gel is formed, and a polymer gel layer formed by the silicone polymer gel is formed to cover the colored particles.

After the reaction, the particles are precipitated using a centrifugal separator, and then washing with silicone oil is repeated for purification. The concentration is adjusted by using silicone oil, thereby producing a 5% by weight particle dispersion liquid for a display (magenta color).

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 400 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the generated polymer gel layer is found to be 30% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display exhibit stable moving properties.

Example 2

—Preparation of Polymer α Having Chargeable Group—

A copolymer (having a weight average molecular weight of 60,000) of N-vinyl pyrrolidone and N,N-diethylaminoethyl methacrylate (in a weight ratio of 9/1) is synthesized by common radical solution polymerization. Furthermore, ethyl iodide in an amount equimolar or more relative to the amino groups of the copolymer (polymer) is added to an isopropanol solution of the copolymer (polymer), and the mixture is heated at 80° C. for 1 hour, whereby the amino groups are quaternarized, followed by purification of the copolymer. In this way, a polymer α having a chargeable group is obtained.

—Preparation of Particle Dispersion Liquid for a Display—

A 5% by weight particle dispersion liquid for a display (cyan color) is produced in the same manner as in Example 1, except using a water-dispersed pigment solution (UNISPERSE cyan color: pigment concentration is 26% by weight) manufactured by Ciba together with the polymer α having a chargeable group.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 350 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 25% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Example 3

—Preparation of Reactive Silicone Polymer B—

92 parts by weight of SILAPLANE FM-0711 (manufactured by Chisso Corp.), which is a silicone monomer, 5 parts by weight of 2-hydroxyethyl methacrylate, and 3 parts by weight of glycidyl methacrylate are mixed with 100 parts by weight of di methyl silicone oil (KF-96L-2CS, manufactured by Shin-Etsu Silicone Co., Ltd.). 0.2 part by weight of azobisvaleronitrile is added thereto as a polymerization initiator, and polymerization is carried out at 55° C. for 10 hours, thereby producing a reactive silicone polymer B (reactive dispersant) having an epoxy group. The weight average molecular weight thereof is 820,000. Then, a 3% by weight silicone oil solution of the reactive silicone polymer B is prepared.

—Preparation of Particle Dispersion Liquid for a Display—

A 5% by weight of particle dispersion liquid for a display (magenta color) is produced in the same manner as in Example 1, except using the reactive silicone polymer B in place of the reactive silicone polymer A.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 300 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 28% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display exhibit stable moving properties.

Example 4

—Preparation of Particle Dispersion Liquid for a Display—

A 5% by weight of particle dispersion liquid for a display of (cyan color) is produced in the same manner as in Example 2, except using the reactive silicone polymer B in place of the reactive silicone polymer A.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 350 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 35% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Example 5

—Preparation of Reactive Silicone Polymer C—

95 parts by weight of SILAPLANE FM-0711 (manufactured by Chisso Corp.), which is a silicone monomer, 3 parts by weight of methyl methacrylate, and 2 parts by weight of isocyanate monomer (KARENZ MOI, manufactured by Showa Denko K. K.) are mixed with 100 parts by weight of dimethyl silicone oil (KF-96L-2CS, manufactured by Shin-Etsu Silicone Co., Ltd.). 0.4 part by weight of azobisvaleronitrile is added thereto as a polymerization initiator, and polymerization is carried out, thereby producing a reactive silicone polymer C (reactive dispersant) having an isocyanate group. The weight average molecular weight thereof is 550,000. Then, a 3% by weight silicone oil solution of the reactive silicone polymer C is prepared.

—Preparation of Particle Dispersion Liquid for a Display—

Next, poly(acrylamide 2-methylpropanesulfonic acid) as a polymer having a chargeable group (PAMPS; having a weight average molecular weight of 210,000) is synthesized by common radical solution polymerization, and a 10% by weight aqueous solution thereof is prepared. Then, 3 parts by weight of 10% aqueous solution of the PAMPS and a stoichiometric amount of triethylamine for neutralizing the same are mixed with 1 part by weight of water-dispersed pigment solution (UNISPERSE cyan color: pigment concentration of 26% by weight) manufactured by Ciba. This mixed solution is mixed with 10 parts by weight of the 3% by weight silicone solution of the reactive silicone polymer B, and the mixture is stirred by an ultrasonic crusher, thereby preparing a suspension in which an aqueous solution containing the polymer having a chargeable group and the pigment are dispersed and emulsified in silicone oil.

Next, this suspension is depressurized (2 KPa) and heated (70° C.) for 1 hour to remove the moisture, whereby a silicone oil dispersion liquid in which cyan colored particles containing the polymer having a chargeable group and the pigment are dispersed in silicone oil is obtained. The dispersion liquid is heated at 100° C. for 3 hours, whereby the reactive silicone polymer B (non-crosslinked structure) is reacted with and bonded to the surface of the colored particles. After the reaction, the particles are precipitated using a centrifugal separator, and then washing with silicone oil is repeated for purification.

Next, the purified particles are mixed with 10 parts by weight of the 3% by weight silicone oil solution of the reactive silicone polymer C, and the particles are ultrasonically dispersed. Then, the particle dispersion liquid is heated at 100° C. for 3 hours while stirring, thereby reacting hydroxyl groups or the like present on the surface of the particles with the isocyanate groups of the reactive silicone polymer C and crosslinking the reactive silicone polymer C. In this way, a silicone polymer gel is formed, and a polymer gel layer formed by the silicone polymer gel is formed to cover the colored particles.

After the reaction, the particles are precipitated using a centrifugal separator, and then washing with silicone oil is repeated for purification. The concentration is adjusted by using silicone oil, thereby producing a 5% by weight particle dispersion liquid for a display (cyan color).

The volume average particle diameter of particles for a display in the produced particle dispersion liquid for a display is measured (Horiba LA-300: Laser Scattering and Diffraction Particle Size Analyzer, manufactured by Horiba, Ltd) and found to be 380 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 45% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display exhibit stable moving properties.

Example 6

—Preparation of Particle Dispersion Liquid for a Display—

A 5% by weight particle dispersion liquid for a display (magenta color) is produced in the same manner as in Example 5, except using a water-dispersed pigment solution (UNISPERSE magenta color: pigment concentration is 16% by weight) manufactured by Ciba together with the polymer a having a chargeable group.

The volume average particle diameter of particles for a display in the produced particle dispersion liquid for a display (Horiba LA-300: Laser Scattering and Diffraction Particle Size Analyzer, manufactured by Horiba, Ltd) is measured and found to be 350 nm.

Some of the particles for a display in the particle dispersion liquid for a display are subjected to centrifugal sedimentation. Then, methanol is added to dissolve and wash away the colored particles, and then the remaining substance is subjected to optical analysis. It is revealed that a polymer gel is generated, and, from the amount thereof, the amount of the polymer gel layer is found to be 40% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Example 7

—Preparation of Reactive Long-Chain Alkyl Polymer D—

94 parts by weight of dodecyl methacrylate, which is a long-chain alkyl monomer, 3 parts by weight of hydroxyethyl methacrylate, and 3 parts by weight of glycidyl methacrylate are mixed with 100 parts by weight of toluene. 0.2 part by weight of azobisvaleronitrile is added thereto as a polymerization initiator, and polymerization is carried out, thereby producing a reactive long-chain alkyl polymer D having an epoxy group (reactive dispersant). The weight average molecular weight thereof is 500,000. Then, a 3% by weight solution of the reactive long-chain alkyl polymer D in ISO-PAR M (manufactured by Esso Chemical Co., Ltd.) is prepared.

—Preparation of the Particle Dispersion Liquid for a Display—

Next, poly(acrylamide-2-methylpropanesulfonic acid) as a polymer having a chargeable group (PAMPS; having a weight average molecular weight of 210,000) is synthesized by common radical solution polymerization, thereby preparing a 10% by weight aqueous solution thereof Then, 3 parts by weight of 10% aqueous solution of PAMPS and a stoichiometric amount of triethylamine for neutralizing the same are mixed with 1 part by weight of water-dispersed pigment solution (UNISPERSE magenta color: pigment concentration 16% by weight) manufactured by Ciba. This mixed solution is mixed with 10 parts by weight of the 3% by weight ISOPAR solution of the reactive long-chain alkyl polymer D, and the mixture is stirred by an ultrasonic crusher, thereby preparing a suspension in which an aqueous solution containing the polymer having a chargeable group and the pigment are dispersed and emulsified in ISOPAR.

Next, this suspension is depressurized (2 KPa) and heated (70° C.) for 1 hour to remove the moisture, whereby an ISOPAR dispersion liquid in which magenta colored particles containing the polymer having a chargeable group and the pigment are dispersed in ISOPAR is obtained. The dispersion liquid is heated at 100° C. for 3 hours, whereby the reactive long-chain polymer D (non-crosslinked structure) is reacted with and bonded to the surface of the colored particles.

Next, to the ISOPAR dispersion liquid after the reactive long-chain alkyl polymer D has been reacted with the surface of the colored particles, 0.2 part by weight of triethylamine is added as an epoxy polymerization catalyst (crosslinking agent). The mixture is heated at 100° C. for 3 hours, thereby crosslinking unreacted reactive long-chain alkyl polymer D which remains and coexists in the dispersion liquid. In this way, a polymer gel is formed, and a polymer gel layer formed by the polymer gel is formed to cover the colored particles.

After the reaction, the particles are precipitated using a centrifugal separator, and then cleaning with the ISOPAR solution is repeated for purification. The concentration is adjusted with ISOPAR, thereby producing a 5% by weight particle dispersion liquid for a display (magenta color).

The volume average particle diameter of particles for a display in the produced particle dispersion liquid for a display is measured (Horiba LA-300: Laser Scattering and Diffraction Particle Size Analyzer, manufactured by Horiba, Ltd) and found to be 350 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 30% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display exhibit stable moving properties.

Example 8

—Preparation of Particle Dispersion Liquid for a Display—

A 5% by weight particle dispersion liquid for a display (cyan color) is produced in the same manner as in Example 7, except using a water-dispersed pigment solution (UNISPERSE cyan color: pigment concentration is 26% by weight) manufactured by Ciba together with the polymer a having a chargeable group.

The volume average particle diameter of the particles for a display in the produced particle dispersion liquid for a display is measured (Horiba LA-300; Laser Scattering and Diffraction Particle Size Analyzer, manufactured by Horiba, Ltd) and found to be 350 nm.

Some of the particles for a display in the particle dispersion liquid for a display are subjected to centrifugal sedimentation. Then, methanol is added to dissolve and wash away the colored particles, and then the remaining substance is subjected to optical analysis. As a result, it is revealed that a polymer gel is generated, and, from the amount thereof, the amount of the polymer gel layer is found to be 30% by weight with respect to the colored particles.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Example 9

—Example in Which Gel/Formation is Performed by Surface Polymerization Method Negatively Charged Particles—

A 10% by weight aqueous solution of polymethacrylic acid (weight average molecular weight of 50,000) of the same commercial product (manufactured by Wako Pure Chemical Ind. Ltd.) as that used in Example 1 is prepared as a polymer having a chargeable group. Then, 3 parts by weight of the 10% aqueous solution of polymethacrylic acid and a stoichiometric amount of triethylamine for neutralizing the same are mixed with 1 part by weight of water-dispersed pigment solution (UNISPERSE magenta color: pigment concentration is 16% by weight) manufactured by Ciba, preparing a mixed solution thereof Next, a silicone-modified acrylic polymer KP545 (manufactured by Shin-Etsu Chemicals Co., Ltd.) is added, as an emulsifier, to dimethyl silicone oil (KF-96-2CS, manufactured by Shin-Etsu Silicone Co., Ltd.) to form a 3% by weight silicone solution of KP545. The solution is mixed with 10 parts by weight of the 3% by weight silicone solution of KP545. Then, the mixture is dispersed by an ultrasonic crusher (UH-600S, manufactured by SMT Inc.) to prepare a suspension in which an aqueous solution containing the polymer and the pigment is dispersed in the silicone oil (KF-96L 2CS, manufactured by Shin-Etsu Silicone Co., Ltd.). Further, this suspension is depressurized (2 KPa) and heated (70° C.) for 1 hour to remove the moisture, whereby a silicone oil dispersion liquid in which magenta colored particles are dispersed in silicone oil is obtained. Further, the particles are precipitated using a centrifugal separator, and then washing with a silicone oil (KF-96L 2CS, manufactured by Shin-Etsu Silicone Co., Ltd.) is repeated for purification.

Next, a silicone solution containing an isocyanate monomer (KARENZ MOI manufactured by Showa Denko K. K) at an amount of 0.1% by weight is prepared. The particles prepared above are dispersed in the solution. The resultant dispersion is allowed to react at 60° C. for 2 hours, and then cleaned and purified again by using a silicone oil (KF-96-2CS, manufactured by Shin-Etsu Silicone Co., Ltd.). Polymerizable double bonds are introduced to the surface of the produced particles by this treatment through the reaction between an isocyanate group and a carboxy group.

Further, a silicone polymer gel is formed on the surface of the particles utilizing the polymerizable group. A silicone oil dispersion liquid containing, at an amount of 0.5% by weight, the particles having the polymerization group on the surface is prepared. To 100 parts by weight of the dispersion liquid, 2 parts by weight of SILAPLANE FM-0711(manufactured by Chisso Corp.) which is a silicone monomer and 0.2 part by weight of ethylene glycol dimethacrylate (manufactured by Wako Pure Chemical Ind. Ltd.) as a crosslinking agent are added. Then, 0.01 part by weight of azobisvaleronitrile is added as a polymerization initiator, and, after nitrogen substitution, the mixture is polymerized for 5 hours while stirring at 60° C.

After the polymerization, the particles are precipitated using a centrifugal separator, and then washing with silicone oil is repeated for purification. The concentration is adjusted by using silicone oil, thereby producing a 5% by weight particle dispersion liquid for a display. The volume average particle diameter of the produced particle dispersion liquid is 400 nm. Some of the particles are subjected to centrifugal sedimentation, and then methanol is added to dissolve and wash away the polymethacrylic acid salt and the pigment of the core particles. Then, the remaining substance is subjected to optical analysis, which reveals that a silicone polymer gel is generated, and, from the amount thereof, the amount of the polymer gel layer as a shell is about 25 wt % with respect to the particles.

The charge polarity of electrophoretic particles in this dispersion system is evaluated by enclosing the dispersion liquid between two electrode substrates, and applying a direct current voltage to evaluate the moving direction. As a result, it is revealed that the particles for a display are negatively charged. Moreover, moving properties of the particles are evaluated by repeatedly applying electric fields having different polarities. As a result, it is revealed that the particles for a display exhibit stable moving properties.

Example 10

—Example in Which Gel is Formed by Surface Polymerization Method Positively Charged Particles—

A copolymer (weight average molecular weight of 100,000) of N-vinyl-pyrrolidone, N,N-diethylaminoethyl methacrylate, and 2-hydroxyethyl methacrylate (in a weight ratio of 8.8/1/0.2) is synthesized as a polymer having a chargeable group by common radical solution polymerization in the same manner as in Example 2. Ethyl iodide in an amount equimolar or more relative to the amino groups of the resin is added to the resin in isopropanol, and the resultant mixture is heated at 80° C. for 1 hour, whereby the amino groups are quaternarized. Then, the resultant is purified as a solid again.

A 10% by weight aqueous solution of the copolymer prepared above is prepared. Next, 1 part by weight of a water-dispersed pigment solution (UNISPERSE cyan color, pigment concentration is 26% by weight) manufactured by Ciba and 3 parts by weight of the 10% by weight aqueous solution of the copolymer are mixed. Next, particles are produced using KP545 as an emulsifier in a manner similar to that in Example 9. Then, an isocyanate monomer (KARENZ MOI, manufactured by Showa Denko K. K) and hydroxyl groups on the surface of the particles are similarly reacted with each other, thereby introducing polymerizable double bonds to the surface of the particles.

Further, surface polymerization is performed utilizing the polymerizable groups in a manner similar to that in Example 9, thereby producing a 5% by weight particle dispersion liquid. The volume average particle diameter of the produced particle dispersion liquid is 380 nm. Some of the particles are subjected to centrifugal sedimentation, and then methanol is added to dissolve and wash away the copolymer and the pigment of the core particles. The remaining substance is subjected to optical analysis, which reveals that a silicone polymer gel is generated, and, from the amount thereof the amount of the polymer gel layer as a shell is about 30 wt % with respect to the particles.

The charge polarity of electrophoretic particles in this dispersion system is evaluated by enclosing the dispersion liquid between two electrode substrates, and applying a direct current voltage to evaluate the moving direction. As a result, it is revealed that the particles for a display are positively charged. Moreover, moving properties of the particles are evaluated by repeatedly applying electric fields having different polarities. As a result, it is revealed that the particles for a display exhibit stable moving properties.

Comparative Example 1

—Preparation of Particle Dispersion Liquid for a Display—

A 5% by weight particle dispersion liquid for a display (magenta color) is produced in the same manner as in Example 1, except that the reactive silicone polymer is not crosslinked and the polymer gel layer is not formed.

The volume average particle diameter of the particles for a display in the produced particle dispersion liquid for a display is measured (Horiba LA-300: Laser Scattering Diffraction Particle Size Analyzer, manufactured by Horiba, Ltd) and found to be 350 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged Moreover, moving properties of the particles for a display are evaluated by repeatedly applying electric fields having different polarities. As a result, it is revealed that the particles for a display exhibit stable moving properties.

Comparative Example 2

—Preparation of Particle Dispersion Liquid for a Display—

A 5% by weight particle dispersion liquid for a display (cyan color) is produced in the same manner as in Example 2, except that the reactive silicone polymer is not crosslinked and the polymer gel layer is not formed.

The volume average particle diameter of the particles for a display in the produced particle dispersion liquid for a display (Horiba LA-300: Laser Scattering and Diffraction Particle Size Analyzer, manufactured by Horiba, Ltd) is measured and found to be 310 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Comparative Example 3

—Preparation of Particle Dispersion Liquid for a Display—

A 5% by weight particle dispersion liquid for a display (magenta color) is produced in the same manner as in Example 3, except not crosslinking a reactive silicone polymer and not forming a polymer gel layer.

The volume average particle diameter of particles for a display in the produced particle dispersion liquid for a display is measured (Horiba LA-300: Laser Scattering and Diffraction Particle Size Analyzer, manufactured by Horiba, Ltd) and found to be 270 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display exhibit stable moving properties.

Comparative Example 4

—Preparation of Particle Dispersion Liquid for a Display—

A 5% by weight particle dispersion liquid for a display (cyan color) is produced in the same manner as in Example 4, except that the reactive silicone polymer is not crosslinked and the polymer gel layer is not formed.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 310 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates) and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Comparative Example 5

—Preparation of Particle Dispersion Liquid for a Display—

A 5% by weight particle dispersion liquid for a display (cyan color) is produced in the same manner as in Example 5) except that the reactive silicone polymer is not crosslinked and the polymer gel layer is not formed.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 340 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display have stable moving properties.

Comparative Example 6

—Preparation of Particle Dispersion Liquid for a Display—

A 5% by weight particle dispersion liquid for a display (magenta color) is produced in the same manner as in Example 6, except that the reactive silicone polymer is not crosslinked and the polymer gel layer is not formed.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 340 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that the particles for a display exhibit stable moving properties.

Comparative Example 7

—Preparation of Particle Dispersion Liquid for a Display—

A 5% by weight particle dispersion liquid for a display (magenta color) is produced in the same manner as in Example 7, except that the reactive long-chain alkyl polymer is not crosslinked and the polymer gel layer is not formed.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 390 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display have stable moving properties.

Comparative Example 8

—Preparation of Particle Dispersion Liquid for a Display—

A 5% by weight particle dispersion liquid for a display (cyan color) is produced in the same manner as in Example 8, except not crosslinking a reactive long-chain alkyl polymer and not forming a polymer gel layer.

The volume average particle diameter of the particles for a display in the produced particle dispersion liquid for a display is measured (Horiba LA-300: Laser Scattering and Diffraction Particle Size Analyzer, manufactured by Horiba, Ltd) and found to be 330 nm.

Some of the particles for a display in the particle dispersion liquid for a display are subjected to centrifugal sedimentation. Then, methanol is added to dissolve and wash away the colored particles. As a result, it is revealed that a remaining substance is not observed and a polymer gel is not generated.

The charge polarity of the particles for a display in the particle dispersion liquid for a display is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that the particles for a display have stable moving properties.

Comparative Example 9

Evaluation is performed using the particles before subjected to surface polymerization in Example 9. Some of the particles are subjected to centrifugal sedimentation, and then methanol is added to dissolve and wash away the copolymer and the pigment of the core particles. Evaluation of a remaining substance cannot be conducted because there is no remaining substance; it is found that a polymer gel is not generated.

The charge polarity of the electrophoretic particles in the dispersion system is evaluated by enclosing the dispersion liquid between two electrode substrates, and applying a direct current voltage to evaluate the moving direction. As a result, it is revealed that the particles for a display are negatively charged. Moreover, moving properties of the particles for a display are evaluated by repeatedly applying electric fields having different polarities. As a result, it is revealed that excellent moving properties are initially exhibited, but aggregation of the particles proceeds with time and the dispersion stability is low.

Comparative Example 10

Evaluation is performed using the particles before subjected to surface polymerization in Example 10. Some of the particles are subjected to centrifugal sedimentation, and then methanol is added to dissolve and wash away the copolymer as core particles and the pigment. Evaluation of a remaining substance cannot be conducted because there is no remaining substance; it is found that a polymer gel is not generated.

The charge polarity of electrophoretic particles in this dispersion system is evaluated by enclosing the dispersion liquid between two electrode substrates, and applying a direct current voltage to evaluate the moving direction. As a result, it is revealed that the particles for a display are positively charged. Moreover, moving properties of the particles for a display are evaluated by repeatedly applying electric fields having different polarities. As a result, it is revealed that excellent moving properties are initially exhibited, but aggregation of the particles proceeds with time and the dispersion stability is low.

Evaluation

The negatively charged particle dispersion liquid for a display shown below and the positively charged particle dispersion liquid for a display shown below are selected from the respective particle dispersion liquids for a display produced in the respective Examples and Comparative Examples described above, and are combined and mixed. Then, the moving properties of the respective kinds of particles for a display and the dispersion stability of the respective kinds of particles for a display after mixing are evaluated. Evaluation is performed based on a change in the dispersion state of the mixed solution observed 24 hours after the mixing and the moving properties of the particles for a display observed when the mixed solution is enclosed between two electrode substrates and subjected to repeated application of electric fields having different polarities.

—Mixed Solution of Particle Dispersion Liquid of Example 1 for a Display and Particle Dispersion Liquid of Example 2 for a Display—

Both kinds of the particles for a display are dispersed without aggregation and the optical particle diameter measurement thereof shows no change from immediately after mixing. Moreover, evaluation of moving properties reveals that the respective kinds of particles for a display move while maintaining charge polarities inherent to the respective kinds of particles, and charge stability is maintained even after mixing.

—Mixed Solution of Particle Dispersion Liquid of Example 3 for a Display and Particle Dispersion Liquid of Example 4 for a Display—

Both kinds of the particles for a display are dispersed without aggregation and the optical particle diameter measurement thereof shows no change from immediately after mixing. Moreover, evaluation of moving properties reveals that the respective kinds of particles for a display move while maintaining charge polarities inherent to the respective kinds of particles, and charge stability is maintained even after mixing.

—Mixed Solution of Particle Dispersion Liquid of Example 5 for a Display and Particle Dispersion Liquid of Example 6 for a Display—

Both kinds of the particles for a display are dispersed without aggregation and the optical particle diameter measurement thereof shows no change from immediately after mixing. Moreover, evaluation of moving properties reveals that the respective kinds of particles for a display move while maintaining charge polarities inherent to the respective kinds of particles, and charge stability is maintained even after mixing.

—Mixed Solution of Particle Dispersion Liquid of Example 7 for a Display and Particle Dispersion Liquid of Example 8 for a Display—

Both kinds of the particles for a display are dispersed without aggregation and the optical particle diameter measurement thereof shows no change from immediately after mixing. Moreover, evaluation of moving properties reveals that the respective kinds of particles for a display move while maintaining charge polarities inherent to the respective kinds of particles, and charge stability is maintained even after mixing.

Mixed Solution of Particle Dispersion Liquid of Comparative Example 1 for a Display ant Particle Dispersion Liquid of Comparative Example 2 for a Display—

Aggregation of both kinds of particles for a display proceeds with time and the optical particle diameter measurement shows a change from the value observed immediately after mixing. Moreover, evaluation of moving properties reveals that aggregates of the kinds of particles for a display having both of the polarities also move in addition to the move of the respective kinds of particles for a display retaining the charge polarities inherent to the respective kinds of particles, so that it is found that the charge stability of the respective particles for a display is not maintained after mixing.

—Mixed Solution of Particle Dispersion Liquid of Comparative Example 3 for a Display and Particle Dispersion Liquid of Comparative Example 4 for a Display—

Aggregation of both kinds of particles for a display proceeds with time and the optical particle diameter measurement shows a change from the value observed immediately after mixing. Moreover, evaluation of moving properties reveals that aggregates of the kinds of particles for a display having both of the polarities also move in addition to the move of the respective kinds of particles for a display retaining the charge polarities inherent to the respective kinds of particles, so that it is found that the charge stability of the respective particles for a display is not maintained after mixing.

—Mixed Solution of Particle Dispersion Liquid of Comparative Example 5 for a Display and Particle Dispersion Liquid of Comparative Example 6 for a Display—

Aggregation of both kinds of particles for a display remarkably proceeds with time and the optical particle diameter measurement shows a considerable change from the value observed immediately after mixing. Moreover, evaluation of moving properties reveals that aggregates of the kinds of particles for a display having negative polarity move, so that it is found that charge polarities inherent to the respective kinds of particles are not at all maintained after mixing.

Mixed Solution of Particle Dispersion Liquid of Comparative Example 7 for a Display and Particle Dispersion Liquid of Comparative Example 8 for a Display—

Aggregation of both kinds of particles for a display remarkably proceeds with time and the optical particle diameter measurement shows a considerable change from the value observed immediately after mixing. Moreover, evaluation of moving properties reveals that aggregates of the kinds of particles for a display having negative polarity move, so that it is found that charge polarities inherent to the respective kinds of particles are not at all maintained after mixing.

—Mixed Solution of Particle Dispersion Liquid of Comparative Example 9 for a Display and Particle Dispersion Liquid of Comparative Example 10 for a Display—

Aggregation of both kinds of particles for a display remarkably proceeds with time and the optical particle diameter measurement shows a considerable change from the value observed immediately after mixing. Moreover, evaluation of moving properties reveals that aggregates of the kinds of particles for a display having negative polarity move, so that it is found that charge polarities inherent to the respective kinds of particles are not at all maintained after mixing.

Mixed Solution of Particle Dispersion Liquid of Example 1 for a Display and Particle Dispersion Liquid of Comparative Example 2 for a Display—

The optical particle diameter measurement shows that aggregation proceeds to some degree with time, but the dispersion state is almost maintained. Moreover, evaluation of moving properties reveals that the respective kinds of particles for a display move while maintaining charge polarities inherent to the respective kinds of particles, and charge stability is maintained even after mixing.

—Mixed Solution of Particle Dispersion Liquid of Example 2 for a Display and Particle Dispersion Liquid of Comparative Example 1 for a Display—

The optical particle diameter measurement shows that aggregation proceeds to some degree with time, but the dispersion state is almost maintained. Moreover, evaluation of moving properties reveals that the respective kinds of particles for a display move while maintaining charge polarities inherent to the respective kinds of particles, and charge stability is maintained even after mixing.

The above-described results reveal that, in the particle dispersion liquid for a display of Examples, aggregation of the respective kinds of particles for a display are suppressed, stable dispersion state is maintained, and the charge polarities and the moving properties are also stable even after particle dispersion liquids for a display having different charging characteristic are mixed, compared with the case in which only the particle dispersion liquids for a display of Comparative Examples are mixed.

Example 11

Production of Optical Device Model and Evaluation

Two ITO glass substrates (5 cm×10 cm, 2 mm in thickness) are prepared. Then, the two substrates are adhered to each other at an interval of 100 μm maintained by a tape spacer formed in an outer peripheral portion (an opening is formed at a portion of the spacer), whereby a cell structure (an empty cell) is produced, the electrode substrate surfaces thereof face each other, and the adhesion is performed in an offset manner so as to secure a part of each electrode surface for wiring. Plural pieces of this cell structure are prepared.

A combination of the particle dispersion liquids of Examples 1 and 2 and additional white particles (Sekisui Plastic Co., LTD: XX-29W, $TiO_2$/PMMA particle having a volume average particle size of 500 nm in an amount of 5wt % with respect to the total amount of the mixed liquid), a combination of the particle dispersion liquids of Examples 3 and 4 and additional white particles (Sekisui Plastic Co., LTD: XX-29W, $TiO_2$/PMMA particle having a volume average particle size of 500 nm in an amount of 5 wt % with respect to the total amount of the mixed liquid), a combination of the particle dispersion liquids of Examples 5 and 6 and additional white particles (Sekisui Plastic Co., LTD: XX-29W, $TiO_2$/PMMA particle having a volume average particle size of 500 nm in an amount of 5 wt % with respect to the total amount of the mixed liquid), a combination of the particle dispersion liquids of Examples 7 and 8 and additional white particles (Sekisui Plastic Co., LTD: XX-29W, $TiO_2$/PMMA particle having a volume average particle size of 500 nm in an amount of 5 wt % with respect to the total amount of the mixed liquid), and a combination of the particle dispersion liquids of Examples 9 and 10 and additional white particles (Sekisui Plastic Co., LTD: XX-29W, $TiO_2$/PMA particle having a volume average particle size of 500 nm in an amount of 5 wt % with respect to the total amount of the mixed liquid) are injected, by vacuum, into respectively different cells (empty cells) from the opening thereof, and the opening is sealed, whereby five kinds of optical devices for evaluation are obtained.

When 10 V direct current voltages having different polarities are alternately applied to the produced optical devices, each device alternately displays a magenta color and a cyan color. Regarding the repetition stability, the alternate display can be stably carried out 100,000 times or more.

Moreover, a display color (magenta or cyan) is displayed by applying a direct current voltage. Then, application of the direct current voltage is stopped (the electric field is eliminated). When the display density immediately after stopping the voltage application and the display density 24 hours after stopping the voltage application are measured with an X-rite (manufactured by X-rite), there is no change in the display density in each of the case in which magenta is displayed and the case in which cyan is displayed; this results indicate stable memory storage properties.

What is claimed is:

1. A particle for a display comprising:
a colored particle containing a colorant and a polymer having a chargeable group; and
a polymer gel layer that covers a surface of the colored particle and contains a polymer gel, wherein the particle satisfies the following conditions (i) or (ii):
(i) the polymer gel layer being chemically bonded to the surface of the colored particle; or
(ii) the particle comprising, between the colored particle and the polymer gel layer, a non-crosslinked structure of a first reactive silicone polymer or a non-crosslinked structure of a first non-crosslinked reactive long-chain alkyl polymer, the non-crosslinked structure being bonded to or covering the surface of the colored particle.

2. The particle for a display according to claim 1, wherein the polymer gel comprises at least a crosslinked structure of a reactive silicone polymer or a crosslinked structure of a reactive long-chain alkyl polymer.

3. The particle for a display according to claim 1, wherein the polymer gel is formed of a material that does not contain a chargeable group whose charging polarity is the same as that of the chargeable group of the colored particle.

4. The particle for a display according to claim 1, wherein the particle satisfies condition (ii).

5. The particle for a display according to claim 4, wherein the polymer gel layer is formed by, after providing the non-crosslinked first reactive silicone polymer or the non-crosslinked first reactive long-chain alkyl polymer so as to bond to or cover the surface of the colored particle, providing a second reactive silicone polymer or a second reactive long-chain alkyl polymer, which is different from the first reactive silicone polymer or the first reactive long-chain alkyl polymer, so as to cause the second reactive silicone polymer or the second reactive long-chain alkyl polymer to react with the first reactive silicone polymer or the first reactive long-chain alkyl polymer and so as to crosslink the second reactive silicone polymer or the second reactive long-chain alkyl polymer.

6. A particle dispersion liquid for a display comprising:
a group of particles including the particle for a display according to claim 1; and
a dispersion medium in which the group of particles is dispersed.

7. The particle dispersion liquid for a display according to claim 6, wherein the dispersion medium is silicone oil.

8. The particle dispersion liquid for a display according to claim 6, wherein the dispersion medium is a paraffin hydrocarbon solvent.

9. The particle dispersion liquid for a display according to claim 6, wherein the group of particles includes plural kinds of particles for a display and the plural kinds of particles include kinds of particles having different charge polarities from each other.

10. A display medium comprising:
a pair of substrates, at least one of which transmits light; and
the particle dispersion liquid for a display according to claim 6, which is disposed and sealed between the pair of substrates.

11. A display medium comprising:
a pair of electrodes, at least one of which transmits light; and
an area disposed between the pair of electrodes and containing the particle dispersion liquid for a display according to claim 6.

12. A display device comprising:
the display medium according to claim 10; and
a voltage applying unit that applies a voltage between the pair of substrates of the display medium.

13. A display device comprising:
the display medium according to claim 11; and
a voltage applying unit that applies a voltage between the pair of electrodes of the display medium.

14. The particle for display according to claim 1, wherein the particle satisfies condition (i).

* * * * *